(12) United States Patent
Kawai et al.

(10) Patent No.: US 10,795,017 B2
(45) Date of Patent: Oct. 6, 2020

(54) DUAL POLARIZATION RADAR APPARATUS AND RADAR SIGNAL PROCESSING METHOD

(71) Applicant: Mitsubishi Electric Corporation, Tokyo (JP)

(72) Inventors: Marie Kawai, Tokyo (JP); Hiroshi Sakamaki, Tokyo (JP); Nobuhiro Suzuki, Tokyo (JP); Tomoya Matsuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 399 days.

(21) Appl. No.: 15/570,959

(22) PCT Filed: Sep. 29, 2015

(86) PCT No.: PCT/JP2015/077533
§ 371 (c)(1),
(2) Date: Oct. 31, 2017

(87) PCT Pub. No.: WO2017/056193
PCT Pub. Date: Apr. 6, 2017

(65) Prior Publication Data
US 2018/0292530 A1    Oct. 11, 2018

(51) Int. Cl.
*G01S 13/95* (2006.01)
*G01S 7/42* (2006.01)
(Continued)

(52) U.S. Cl.
CPC .............. *G01S 13/95* (2013.01); *G01S 7/025* (2013.01); *G01S 7/42* (2013.01); *G01S 13/581* (2013.01); *Y02A 90/18* (2018.01)

(58) Field of Classification Search
CPC ................................. G01S 13/95; G01S 7/025
(Continued)

(56) References Cited

U.S. PATENT DOCUMENTS

| 5,500,646 A * | 3/1996 | Zrnic | G01S 7/024 |
| | | | 342/188 |
| 7,589,666 B2 * | 9/2009 | Passarelli, Jr. | G01S 13/5244 |
| | | | 342/196 |

(Continued)

FOREIGN PATENT DOCUMENTS

| JP | H05-087919 A | 4/1993 |
| JP | H07-270529 A | 10/1995 |

(Continued)

OTHER PUBLICATIONS

International Search Report issued in PCT/JP2015/077533; dated Jan. 12, 2016.

(Continued)

*Primary Examiner* — Marcus E Windrich
(74) *Attorney, Agent, or Firm* — Studebaker & Brackett PC

(57) ABSTRACT

A linear-depolarization ratio calculator (12) is configured so as to determine a radar reflectivity factor $Z_{hh}$ in transmission of a horizontally polarized wave and reception of a horizontally polarized wave, the radar reflectivity factor being a reflected wave intensity after integration of a reflected wave intensity $V_{hh}(n)$ calculated by a reflected-wave intensity calculator (11), and a radar reflectivity factor $Z_{vh}$ in transmission of a horizontally polarized wave and reception of a vertically polarized wave, the radar reflectivity factor being a reflected wave intensity after integration of a reflected wave intensity $V_{vh}(n+2)$ and calculate a linear depolarization ratio $LDR_{vh}$ which is the ratio between the radar reflectivity factor $Z_{hh}$ and the radar reflectivity factor $Z_{vh}$. As a result, even when three types of polarized-wave transmission/reception processing elements are repeatedly performed, the linear depolarization ratio $LDR_{vh}$ can be calculated.

10 Claims, 5 Drawing Sheets

(51) Int. Cl.
*G01S 7/02* (2006.01)
*G01S 13/58* (2006.01)

(58) Field of Classification Search
USPC .............................................. 342/26 R–26 D
See application file for complete search history.

(56) References Cited

U.S. PATENT DOCUMENTS

| | | | |
|---|---|---|---|
| 7,928,894 B1 | 4/2011 | Fox | |
| 9,519,057 B1* | 12/2016 | Eilts | ........................ G01W 1/00 |
| 2011/0063161 A1* | 3/2011 | Ishizawa | .................... G01S 7/03 |
| | | | 342/159 |
| 2014/0333475 A1* | 11/2014 | Sierwald | ............... G01S 13/951 |
| | | | 342/26 R |
| 2015/0145717 A1* | 5/2015 | Lim | ........................ G01S 7/292 |
| | | | 342/26 R |
| 2018/0074166 A1* | 3/2018 | Slapak | .................. G01S 7/4017 |

FOREIGN PATENT DOCUMENTS

| | | |
|---|---|---|
| JP | 2001-091643 A | 4/2001 |
| JP | 2002-014161 A | 1/2002 |
| JP | 2003-185745 A | 7/2003 |
| JP | 2004-170188 A | 6/2004 |
| JP | 2008-164494 A | 7/2008 |
| JP | 2009-008440 A | 1/2009 |
| JP | 2009-025083 A | 2/2009 |
| JP | 2010-085164 A | 4/2010 |
| JP | 2011-059078 A | 3/2011 |
| JP | 2014-102235 A | 6/2014 |

OTHER PUBLICATIONS

M. Sachidananda et al.; "Efficient Processing of Alternately Polarized Radar Signals"; Journal of Atmospheric and Oceanic Technology; Feb. 1989; pp. 173-181; vol. 6, Issue 1; American Meteorological Society.

S. M. Cherry, "The Development of the Chilbolton Radar 1977 to 1988", International Geoscience and Remote Sensing Symposium 2006, Jul. 1, 2006, pp. 1662-1665.

Y. Golestani et al., "Dual Polarized Staggered PRT Scheme for Weather Radars: Analysis and Applications", IEEE Transactions on Geoscience and Remote Sensing, vol. 33, No. 2, Mar. 1, 1995, pp. 239-246.

Extended European Search Report issued by the European Patent Office dated Mar. 29, 2019, which corresponds to EP15905348.7-1206 and is related to U.S. Appl. No. 15/570,959.

* cited by examiner

DUAL POLARIZATION RADAR APPARATUS AND RADAR SIGNAL PROCESSING METHOD

TECHNICAL FIELD

The present invention relates to a dual polarization radar apparatus and radar signal processing method for estimating the intensity of rainfall and/or a Doppler velocity by using a horizontally polarized wave and a vertically polarized wave.

BACKGROUND ART

In a widely-used weather radar with a single polarized wave, the intensity of rainfall is estimated from an echo intensity by using a relational expression established between the echo intensity and the intensity of rainfall. However, because this relational expression changes greatly dependently on a particle size distribution of raindrops, it is difficult for the weather radar with a single polarized wave to correctly estimate the intensity of rainfall.

In general, a raindrop has a shape close to a spheroid which is like a sphere crushed in a perpendicular direction. A raindrop having a large particle diameter has a large degree of flatness, while a raindrop having a small particle diameter has a small degree of flatness and is nearly a sphere. For this reason, because information corresponding to a particle size distribution is acquired as information about the shapes of raindrops when a dual polarization radar observation using both a horizontally polarized wave and a vertically polarized wave is performed, a high-accuracy measurement of the intensity of rainfall can be performed.

In transmission and reception of polarized waves in a dual polarization radar, a ratio between the backscattered power of the same polarized wave as a transmission polarized wave and the backscattered power produced by a polarized wave perpendicular to the transmission polarized wave is called a linear depolarization ratio (LDR).

The linear depolarization ratio serves as an index of qualitative determination of the shapes and/or the directions of ice particles, etc., and becomes an effective parameter when a scattering ($Z_{hv}$, $Z_{vh}$) of a polarized wave perpendicular to a transmission polarized wave in precipitation particles is relatively strong in a bright band or the like.

When a linear depolarization ratio is observed by using mutual transmission and mutual reception, it is necessary to repeatedly perform the following three types of polarized-wave transmission/reception processing elements:

(1) "Transmission of a horizontally polarized wave and reception of a horizontally polarized wave" which is transmission/reception processing to transmit a horizontally polarized wave and receive a horizontally polarized wave;

(2) "Transmission of a vertically polarized wave and reception of a vertically polarized wave" which is transmission/reception processing to transmit a vertically polarized wave and receive a vertically polarized wave; and (3) "Transmission of a horizontally polarized wave and reception of a vertically polarized wave" which is transmission/reception processing to transmit a horizontally polarized wave and receive a vertically polarized wave, or "transmission of a vertically polarized wave and reception of a horizontally polarized wave" which is transmission/reception processing to transmit a vertically polarized wave and receive a horizontally polarized wave.

In the case in which the three types of polarized-wave transmission/reception processing elements are repeatedly performed, the observation time of a polarized wave is increased to three times as long as that in a case in which either processing to transmit a single polarized wave and receive a single polarized wave or processing to concurrently transmit polarized waves and concurrently receive polarized waves is performed. Therefore, it is assumed that in general, a Nyquist rate which is a range within which the Doppler velocity can be observed is decreased to one-third as high as that in the case in which, for example, processing to transmit a single polarized wave and receive a single polarized wave is performed.

Non-patent Literature 1 as listed below discloses a method of, in a case of repeatedly performing the following two types of polarized-wave transmission/reception processing elements: "transmission of a horizontally polarized wave and reception of a horizontally polarized wave" and "transmission of a vertically polarized wave and reception of a vertically polarized wave", preventing the Nyquist rate from decreasing as compared with the case in which, for example, processing to transmit a single polarized wave and receive a single polarized wave is performed.

CITATION LIST

Non-Patent Literature

Non-patent Literature 1: M. SACHIDANANDA AND D. S. ZRNIC, Efficient Processing of Alternately Polarized Radar Signals, 1989.

SUMMARY OF INVENTION

Technical Problem

Because the conventional dual polarization radar apparatus is configured as described above, by using the method disclosed by Non-patent Literature 1, in the case of repeatedly performing the following two types of polarized wave transmission/reception processing elements: "transmission of a horizontally polarized wave and reception of a horizontally polarized wave" and "transmission of a vertically polarized wave and reception of a vertically polarized wave", the Nyquist rate can be prevented from decreasing as compared with the case in which, for example, processing to transmit a single polarized wave and receive a single polarized wave is performed. However, there is the problem with the method disclosed by Non-patent Literature 1 is that the case of repeatedly performing the three types of polarized-wave transmission/reception processing elements is not considered into account, and a linear depolarization ratio cannot be calculated.

The present invention is made in order to solve the above-mentioned problem, and it is therefore an object of the present invention to provide a dual polarization radar apparatus and radar signal processing method which are capable of calculating a linear depolarization ratio while preventing the Nyquist rate from decreasing, even when the three types of polarized wave transmission/reception processing elements are repeated.

Solution to Problem

According to the present invention, there is provided a dual polarization radar apparatus which includes: a transmission/reception device configured to repeatedly perform, in turn, first transmission/reception processing to transmit a horizontally polarized wave and receive a horizontally polarized wave, second transmission/reception processing to transmit a vertically polarized wave and receive a vertically polarized wave, and either third transmission/reception processing to transmit a horizontally polarized wave and receive a vertically polarized wave or fourth transmission/reception processing to transmit a vertically polarized wave and receive a horizontally polarized wave; a reflected-wave intensity calculator configured to calculate a first reflected wave intensity which is a power value of a horizontally polarized wave received through the first transmission/reception processing, calculate a second reflected wave intensity which is a power value of a vertically polarized wave received through the second transmission/reception processing, and calculate either a third reflected wave intensity which is a power value of a vertically polarized wave received through the third transmission/reception processing, or a fourth reflected wave intensity which is a power value of a horizontally polarized wave received through the fourth transmission/reception processing; and a linear-depolarization ratio calculator configured to calculate a linear depolarization ratio which is either the ratio between the first reflected wave intensity and the third reflected wave intensity or the ratio between the second reflected wave intensity and the fourth reflected wave intensity. The velocity calculator uses a pulse pair method to calculate a Doppler velocity of an observation object reflecting polarized waves, from the first reflected wave intensity, the second reflected wave intensity and either the third reflected wave intensity or the fourth reflected wave intensity. Specifically, the velocity calculator calculates a lag of autocorrelation in each of transmission polarized waves at time intervals at which a polarized wave is repeatedly transmitted by the transmission/reception device, from the first reflected wave intensity, the second reflected wave intensity and either the third reflected wave intensity or the fourth reflected wave intensity, calculates a phase difference between polarized waves repeatedly transmitted by the transmission/reception device from the lag, and calculates the Doppler velocity of the observation object, from the lag, the phase difference between polarized waves, and a Nyquist rate which indicates a range allowing the Doppler velocity to be observed.

Advantageous Effects of Invention

According to the present invention, because the linear-depolarization ratio calculator is configured to calculate the linear depolarization ratio which is either the ratio between the first reflected wave intensity and the third reflected wave intensity or the ratio between the second reflected wave intensity and the fourth reflected wave intensity where the first through fourth reflected wave intensities are calculated by the reflected-wave intensity calculator, there is provided an advantage of being able to calculate the linear depolarization ratio while preventing the Nyquist rate from decreasing, even when the three types of polarized-wave transmission/reception processing elements are repeatedly performed.

DESCRIPTION OF EMBODIMENTS

Hereafter, in order to explain this invention in greater detail, the preferred embodiments of the present invention will be described with reference to the accompanying drawings.

Embodiment 1

Figure 1:
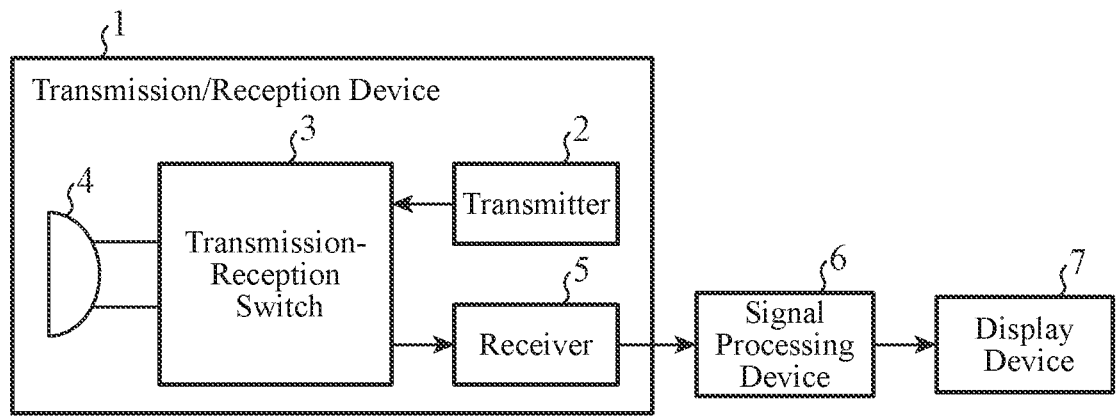
FIG. 1 is a block diagram showing a dual polarization radar apparatus according to Embodiment 1 of the present invention.

FIG. 1 is a block diagram showing a dual polarization radar apparatus according to Embodiment 1 of the present invention.

Figure 2:
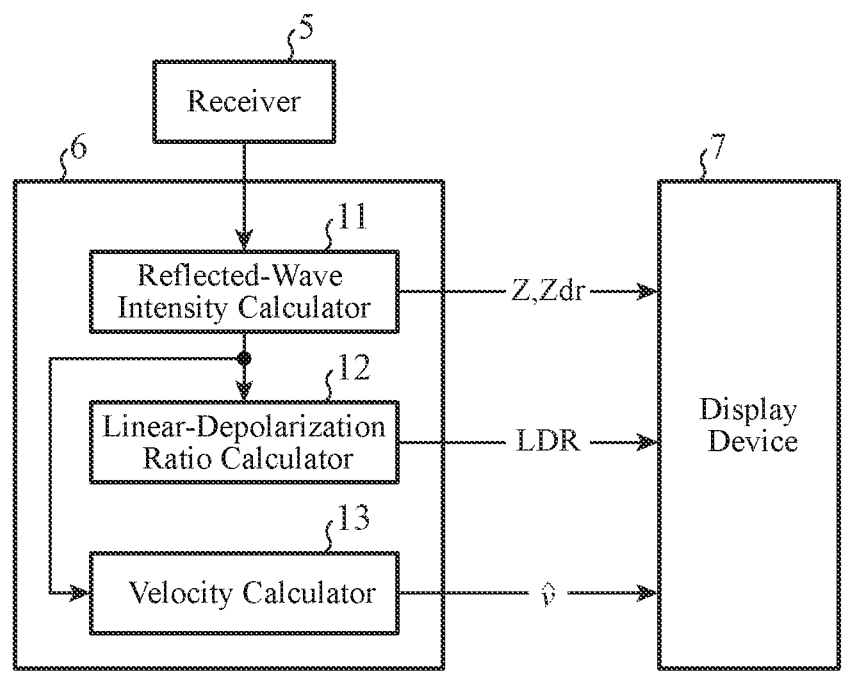
FIG. 2 is a block diagram showing a signal processing device 6 of the dual polarization radar apparatus according to Embodiment 1 of the present invention.
Figure 3:
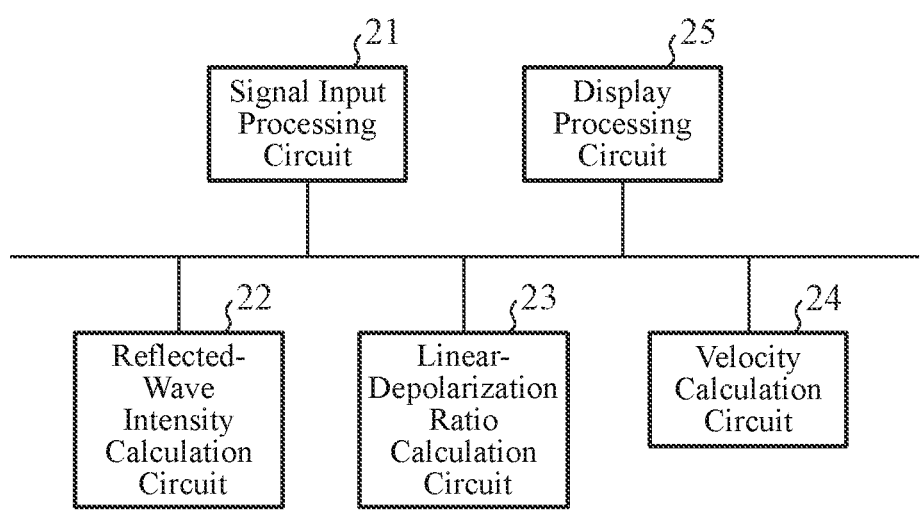
FIG. 3 is a hardware block diagram of the signal processing device 6 shown in FIG. 2.

Further, FIG. 2 is a block diagram showing a signal processing device 6 of the dual polarization radar apparatus according to Embodiment 1 of the present invention, and FIG. 3 is a hardware block diagram of the signal processing device 6 shown in FIG. 2.

In the configurations shown in FIGS. 1 to 3, the transmission/reception device 1 is comprised of a transmitter 2, a transmission-reception switch 3, an antenna 4 and a receiver 5, and repeatedly performs three types of polarized-wave transmission/reception processing elements which are shown below:

(1) "Transmission of a horizontally polarized wave and reception of a horizontally polarized wave" which is first transmission/reception processing to transmit a horizontally polarized wave and receive a horizontally polarized wave;

(2) "Transmission of a vertically polarized wave and reception of a vertically polarized wave" which is second transmission/reception processing to transmit a vertically polarized wave and receive a vertically polarized wave; and (3) "Transmission of a horizontally polarized wave and reception of a vertically polarized wave" which is third transmission/reception processing to transmit a horizontally polarized wave and receive a vertically polarized wave, or "transmission of a vertically polarized wave and reception of a horizontally polarized wave" which is fourth transmission/ reception processing to transmit a vertically polarized wave and receive a horizontally polarized wave.

The transmitter 2 outputs either a horizontally polarized wave or a vertically polarized wave to the transmission-reception switch 3.

The transmission-reception switch 3 outputs either the horizontally polarized wave or the vertically polarized wave outputted from the transmitter 2 to the antenna 4, and outputs either a horizontally polarized wave or a vertically polarized wave received by the antenna 4 to the receiver 5.

The antenna 4 emits either the horizontally polarized wave or the vertically polarized wave outputted from the transmission-reception switch 3 toward space, while the antenna 4 receives either a horizontally polarized wave or a vertically polarized wave which is reflected by an observation object, such as raindrops existing in the space, and then returns thereto.

The receiver 5 performs processing to receive either the horizontally polarized wave or the vertically polarized wave received by the antenna 4, converts an analog received signal of either the horizontally polarized wave or the vertically polarized wave into a digital received signal, and outputs the digital received signal to the signal processing device 6.

The signal processing device 6 is comprised of a reflected-wave intensity calculator 11, a linear-depolarization ratio calculator 12 and a velocity calculator 13. The signal processing device 6 calculates reflected wave intensities which are the power values of a horizontally polarized wave and a vertically polarized wave, from the digital received signals of the horizontally polarized wave and the vertically polarized wave which are outputted from the transmission/reception device 1, calculates a linear depolarization ratio LDR from the reflected wave intensities, and calculates the Doppler velocity v-hat of an observation object. Since the symbol "^" cannot be attached to the top of the character "v" in the document of the description because of the restriction on an electronic application, "v" with "^" is denoted by "v-hat" for convenience' sake.

The display device 7 is comprised of a liquid crystal display or the like, and displays the linear depolarization ratio LDR, the Doppler velocity v-hat, etc. which are calculated by the signal processing device 6.

The reflected-wave intensity calculator 11 is implemented by a signal input processing circuit 21 that is a signal input interface for receiving a digital received signal outputted from the transmission/reception device 1, a reflected-wave intensity calculation circuit 22 that includes, for example, a semiconductor processing circuit equipped with a CPU (Central Processing Unit), a one chip microcomputer or the like, and a display processing circuit 25 that is an interface for the display device 7.

The reflected-wave intensity calculator 11 performs processing to calculate a reflected wave intensity $V_{hh}$ (first reflected wave intensity) which is the power value of a horizontally polarized wave received through the first transmission/reception processing in the transmission/reception device 1, from the digital received signal of the horizontally polarized wave, and also to calculate a reflected wave intensity $V_{vv}$ (second reflected wave intensity) which is the power value of a vertically polarized wave received through the second transmission/reception processing, from the digital received signal of the vertically polarized wave.

The reflected-wave intensity calculator 11 also performs either processing to calculate a reflected wave intensity $V_{vh}$ (third reflected wave intensity) which is the power value of a vertically polarized wave received through the third transmission/reception processing, from the digital received signal of the vertically polarized wave, or processing to calculate a reflected wave intensity $V_{hv}$ (fourth reflected wave intensity) which is the power value of a horizontally polarized wave received through the fourth transmission/reception processing, from the digital received signal of the horizontally polarized wave.

The reflected-wave intensity calculator 11 further performs processing to calculate a radar reflectivity factor $Z_{hh}$ in the transmission of a horizontally polarized wave and the reception of a horizontally polarized wave, a radar reflectivity factor $Z_{vv}$ in the transmission of a vertically polarized wave and the reception of a vertically polarized wave, and a radar reflectivity factor $Z_{vh}$ in the transmission of a horizontally polarized wave and the reception of a vertically polarized wave (or a radar reflectivity factor $Z_{hv}$ in the transmission of a vertically polarized wave and the reception of a horizontally polarized wave) by integrating the reflected wave intensities $V_{hh}$, $V_{vv}$ and $V_{vh}$ (or $V_{hv}$), and also to calculate a radar reflectivity factor difference Zdr which is the ratio between the radar reflectivity factor $Z_{hh}$ and the radar reflectivity factor $Z_{vv}$.

The reflected-wave intensity calculator 11 further performs processing to display the calculated radar reflectivity factors $Z_{hh}$, $Z_{vv}$ and $Z_{vh}$ (or $Z_{hv}$) and the calculated radar reflectivity factor difference Zdr, on the display device 7.

The linear-depolarization ratio calculator 12 is implemented by a linear-depolarization ratio calculation circuit 23 that includes, for example, a semiconductor processing circuit equipped with a CPU, a one chip microcomputer or the like, and a display processing circuit 25 that includes, for example, a semiconductor processing circuit equipped with a CPU, a one chip microcomputer or the like, and calculates a linear depolarization ratio $LDR_{vh}$ which is the ratio between the reflected wave intensity $V_{hh}$ and the reflected wave intensity $V_{vh}$ which are calculated by the reflected-wave intensity calculator 11, i.e., the ratio between the radar reflectivity factor $Z_{hh}$ and the radar reflectivity factor $Z_{vh}$. Instead, the linear-depolarization ratio calculator performs processing to calculate a linear depolarization ratio $LDR_{hv}$ which is the ratio between the reflected wave intensity $V_{vv}$ and the reflected wave intensity $V_{hv}$ which are calculated by the reflected-wave intensity calculator 11, i.e., the ratio between the radar reflectivity factor $Z_{vv}$ and the radar reflectivity factor $Z_{hv}$.

The linear-depolarization ratio calculator 12 also performs processing to display the calculated linear depolarization ratio $LDR_{vh}$ or $LDR_{hv}$ on the display device 7.

The velocity calculator 13 is implemented by a velocity calculation circuit 24 that includes, for example, a semiconductor processing circuit equipped with a CPU, a one chip microcomputer or the like, and a display processing circuit 25 that includes, for example, a semiconductor processing circuit equipped with a CPU, a one chip microcomputer or the like, and performs processing to calculate the Doppler velocity v-hat of an observation object from the reflected wave intensities $V_{hh}$, $V_{vv}$ and $V_{vh}$ or $V_{hv}$, which are calculated by the reflected-wave intensity calculator 11, by using a pulse pair method.

The velocity calculator 13 also performs processing to display the calculated Doppler velocity v-hat on the display device 7.

In the example shown in FIG. 1, it is assumed that each of the following components: the reflected-wave intensity calculator 11, the linear-depolarization ratio calculator 12 and the velocity calculator 13, which are components of the signal processing device 6, includes dedicated hardware components. Instead, the signal processing device 6 can includes a computer.

Figure 4:
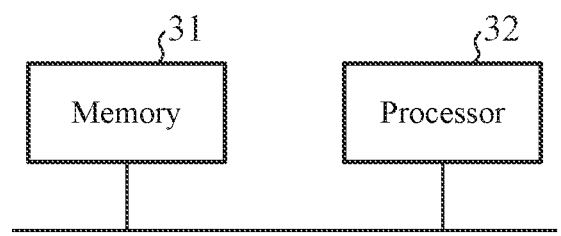
FIG. 4 is a hardware block diagram in a case in which the signal processing device 6 includes a computer.

FIG. 4 is a hardware block diagram in the case in which the signal processing device 6 includes a computer.

In the case in which the signal processing device 6 includes a computer, a program, which describes the operations to be performed by the reflected-wave intensity calculator 11, the linear-depolarization ratio calculator 12 and the velocity calculator 13, can be stored in a memory 31 of the computer, and a processor 32 of the computer can be configured to execute the program stored in the memory 31.

Figure 5:
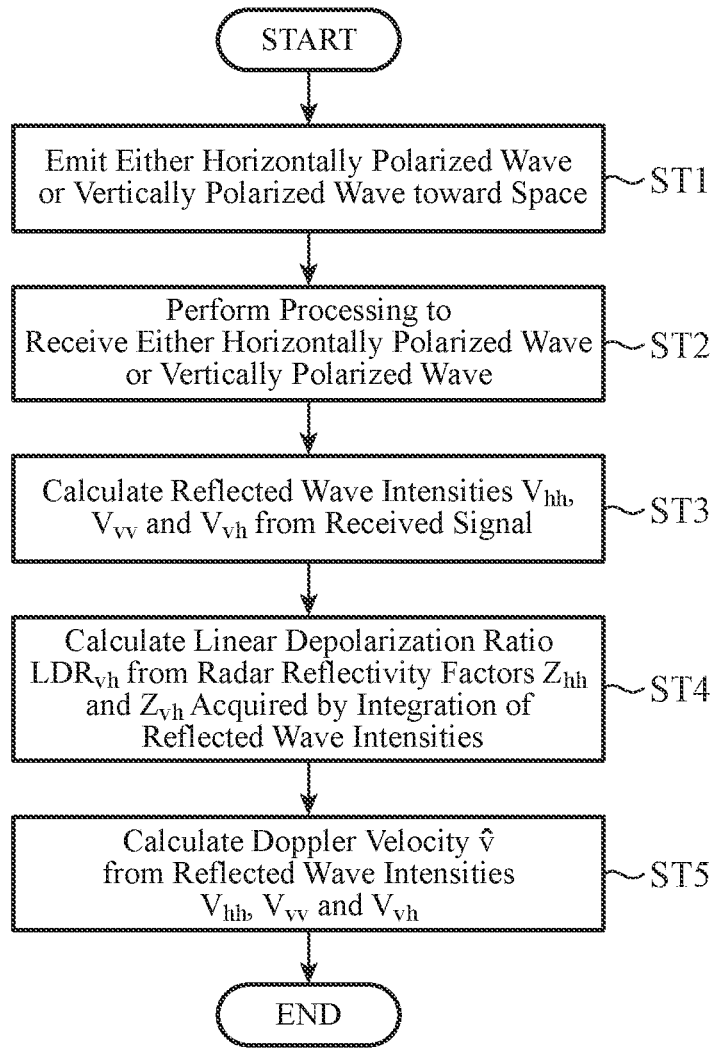
FIG. 5 is a flow chart showing a radar signal processing method which corresponds to processing performed by the dual polarization radar apparatus according to Embodiment 1 of the present invention.

FIG. 5 is a flow chart showing a radar signal processing method which corresponds to processing performed by the dual polarization radar apparatus according to Embodiment 1 of the present invention.

Although in the example shown in FIG. 4 the single processor 32 is illustrated as an example, the computer can be equipped with two or more processors 32.

Next, operations will be explained.

Figure 6:
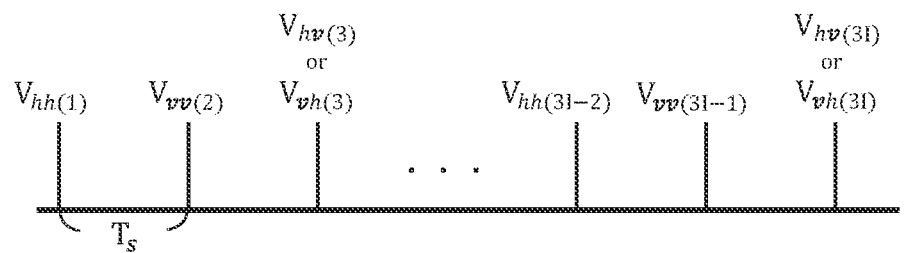
FIG. 6 is an explanatory drawing showing an example in which the length of each of time intervals at which a polarized wave is transmitted and received by a transmission/reception device 1 is Ts.

FIG. 6 is an explanatory drawing showing an example in which the length of each of time intervals at which a polarized wave is transmitted and received by the transmission/reception device 1 is $T_s$.

In the example shown in FIG. 6, "the transmission of a horizontally polarized wave and the reception of a horizontally polarized wave" which is the first transmission/reception processing is performed at a time of $(3i-2) \cdot T_s$, "the transmission of a vertically polarized wave and the reception of a vertically polarized wave" which is the second transmission/reception processing is performed at a time of $(3i-1) \cdot T_s$, and either "the transmission of a horizontally polarized wave and the reception of a vertically polarized wave" which is the third transmission/reception processing or "the transmission of a vertically polarized wave and the reception of a horizontally polarized wave" which is the fourth transmission/reception processing is performed at a time of $3i \cdot T_s$.

In this example, i=1, 2, 3, . . . , and I.

I denotes the number of sample pairs (the number of hits in each of the following processes: the transmission of a horizontally polarized wave and the reception of a horizontally polarized wave, the transmission of a vertically polarized wave and the reception of a vertically polarized wave, and the transmission of a horizontally polarized wave and the reception of a vertically polarized wave (or the transmission of a vertically polarized wave and the reception of a horizontally polarized wave)).

In this Embodiment 1, it is assumed that the transmission/reception device 1 performs "the transmission of a horizontally polarized wave and the reception of a horizontally polarized wave" which is the first transmission/reception processing, "the transmission of a vertically polarized wave and the reception of a vertically polarized wave" which is the second transmission/reception processing, and "the transmission of a horizontally polarized wave and the reception of a vertically polarized wave" which is the third transmission/reception processing.

In the example shown in FIG. 6, the order in which the processing elements are in turn executed is as follows: "the transmission of a horizontally polarized wave and the reception of a horizontally polarized wave"→"the transmission of a vertically polarized wave and the reception of a vertically polarized wave"→"the transmission of a horizontally polarized wave and the reception of a vertically polarized wave."

In this Embodiment 1, an example in which the observation object of the dual polarization radar apparatus is raindrops will be explained.

Because the transmitter 2 of the transmission/reception device 1 performs the transmission/reception processing elements in the following order: "the transmission of a horizontally polarized wave and the reception of a horizontally polarized wave"→"the transmission of a vertically polarized wave and the reception of a vertically polarized wave"→"the transmission of a horizontally polarized wave and the reception of a vertically polarized wave", the transmitter transmits a horizontally polarized wave→a vertically polarized wave→a horizontally polarized wave→a horizontally polarized wave →a vertically polarized wave→a horizontally polarized wave → . . . →a horizontally polarized wave→a vertically polarized wave→a horizontally polarized wave at transmission time intervals of $T_s$.

When receiving either a horizontally polarized wave or a vertically polarized wave from the transmitter 2, the transmission-reception switch 3 outputs either the horizontally polarized wave or the vertically polarized wave to the antenna 4.

When receiving either the horizontally polarized wave or the vertically polarized wave from the transmission-reception switch 3, the antenna 4 emits either the horizontally polarized wave or the vertically polarized wave toward space (step ST1 of FIG. 5).

After emitting either the horizontally polarized wave or the vertically polarized wave toward space, the antenna 4 receives either the horizontally polarized wave or the vertically polarized wave which is reflected by raindrops which are the observation object and then returns thereto.

In the example shown in FIG. 6, the antenna receives a horizontally polarized wave→a vertically polarized wave→a vertically polarized wave→a horizontally polarized wave →a vertically polarized wave→a vertically polarized wave → . . . → a horizontally polarized wave→a vertically polarized wave→a vertically polarized wave at reception time intervals of $T_s$.

The transmission-reception switch 3 outputs either the horizontally polarized wave or the vertically polarized wave received by the antenna 4 to the receiver 5.

The receiver 5 performs the processing to receive either the horizontally polarized wave or the vertically polarized wave received by the antenna 4, convert an analog received signal of either the horizontally polarized wave or the vertically polarized wave into a digital received signal, and output the digital received signal to the signal processing device 6 (step ST2).

The reflected-wave intensity calculator 11 of the signal processing device 6 calculates the reflected wave intensity Vrin which is the power value of a horizontally polarized wave received through the first transmission/reception processing by the transmission/reception device 1, from the digital received signal of the horizontally polarized wave, and also calculates the reflected wave intensity $V_{vv}$ which is the power value of a vertically polarized wave received through the second transmission/reception processing, from the digital received signal of the vertically polarized wave. The reflected-wave intensity calculator further calculates the reflected wave intensity $V_{vh}$ which is the power value of a vertically polarized wave received through the third transmission/reception processing, from the digital received signal of the vertically polarized wave (step ST3).

Hereafter, the processing to calculate the reflected wave intensities $V_{hh}$, $V_{vv}$ and $V_{vh}$ which is performed by the reflected-wave intensity calculator 11 will be explained concretely.

Because raindrops which are the observation object typically exist randomly in space, the digital received signals outputted from the transmission/reception device 1 have a random nature.

Therefore, it is desirable that when calculating the reflected wave intensities $V_{hh}$, $V_{vv}$ and $V_{vh}$, the reflected-wave intensity calculator 11 performs averaging (numerical integration) of digital received signals (statistically-independent received signals) which are acquired through transmissions of a polarized wave (multiple transmissions of a pulse), thereby suppressing a fluctuation in an estimated value of each of reflected wave intensities which will be mentioned below, and improving the accuracy of each of the reflected wave intensities. In this regard, the digital received signals which are the target for the above-mentioned averaging process are the digital received signals of horizontally polarized waves received through the first transmission/reception processing multiple times, the digital received signals of vertically polarized waves received through the second transmission/reception processing multiple times, and the digital received signals of vertically polarized waves received through the third transmission/reception processing multiple times.

In this regard, a relational expression showing a relation among a voltage matrix of backward scattered received signals which are received signals of the antenna 4, a transmission matrix of polarized waves, and a backward scattered matrix of polarized waves is typically expressed by the following equations (1) to (3):

$$\begin{bmatrix} V_h \\ V_v \end{bmatrix} = \frac{\lambda G}{4\pi r^2} \begin{bmatrix} S_{hh} e^{2\lambda_1 r} & S_{hv} e^{(\lambda_1+\lambda_2)r} \\ S_{vh} e^{(\lambda_1+\lambda_2)r} & S_{vv} e^{2\lambda_2 r} \end{bmatrix} \begin{bmatrix} M_h \\ M_v \end{bmatrix} \quad (1)$$

$$\lambda_1 = -jk_{eff}^h = -j\left(k_0 + \frac{2\pi}{k_0}\langle f_{hh}(t,t)\rangle\right) = -j(k_0 + k_h) \quad (2)$$

$$\lambda_2 = -jk_{eff}^v = -j\left(k_0 + \frac{2\pi}{k_0}\langle f_{vv}(t,t)\rangle\right) = -j(k_0 + k_v) \quad (3)$$

where $V_h$: the voltage of the backward scattered received signal of a horizontally polarized wave;
$V_v$: the voltage of the backward scattered received signal of a vertically polarized wave;
$S_{hh}$: a scattering parameter in "the transmission of a horizontally polarized wave and the reception of a horizontally polarized wave";
$S_{vv}$: a scattering parameter in "the transmission of a vertically polarized wave and the reception of a vertically polarized wave";
$S_{vh}$: a scattering parameter in "the transmission of a horizontally polarized wave and the reception of a vertically polarized wave";
$S_{hv}$: a scattering parameter in "the transmission of a vertically polarized wave and the reception of a horizontally polarized wave";
$\lambda$: the wavelength of polarized waves;
G: the gain of the antenna 4;
r: the distance from the dual polarization radar apparatus to a raindrop which is an observation object;
$M_n$: a parameter set to 1 when a horizontally polarized wave is transmitted, and set to 0 when a vertically polarized wave is transmitted;
$M_v$: a parameter set to 0 when a horizontally polarized wave is transmitted, and set to 1 when a vertically polarized wave is transmitted;
$k_0$: a propagation constant in free space;
$k_h$: a propagation constant in space which depends on a horizontally polarized wave; and
$k_v$: a propagation constant in space which depends on a vertically polarized wave.

The reflected-wave intensity calculator 11 calculates the sum total of the voltages of the backward scattered received signals which are the digital received signals of horizontally polarized waves received through the first transmission/reception processing multiple times, i.e., a reflected wave intensity $V_{hh}(n)$ in the n-th sample, as shown in the following equation (4).

The reflected-wave intensity calculator 11 also calculates the sum total of the voltages of the backward scattered received signals which are the digital received signals of vertically polarized waves received through the second transmission/reception processing multiple times, i.e., a reflected wave intensity $V_{vv}(n+1)$ in the (n+1)-th sample, as shown in the following equation (5).

The reflected-wave intensity calculator 11 further calculates the sum total of the voltages of the backward scattered received signals which are the digital received signals of vertically polarized waves received through the third transmission/reception processing multiple times, i.e., a reflected wave intensity $V_{vh}(n+2)$ in the (n+2)-th sample, as shown in the following equation (6). These reflected wave intensities are calculated for each of divisions (grid points) of an azimuthal angle in an observation region, and a distance.

$$V_{hh(n)} = \frac{\lambda G}{4\pi r^2} \sum_i S_{hh}^i I^i e^{2\lambda_1 r^i(n)} = \frac{\lambda G}{4\pi r^2} \sum_i S_{hh}^i I^i e^{-2j(k_0+k_h)r^i(n)} \quad (4)$$

$$V_{vv(n+1)} = \frac{\lambda G}{4\pi r^2} \sum_i S_{vv}^i I^i e^{2\lambda_2 r^i(n+1)} = \frac{\lambda G}{4\pi r^2} \sum_i S_{vv}^i I^i e^{-2j(k_0+k_v)r^i(n+1)} \quad (5)$$

$$V_{vh(n+2)} = \quad (6)$$
$$\frac{\lambda G}{4\pi r^2} \sum_i S_{vh}^i I^i e^{(\lambda_1+\lambda_2)r^i(n+2)} = \frac{\lambda G}{4\pi r^2} \sum_i S_{vh}^i I^i e^{-j(2k_0+k_h+k_v)r^i(n+2)}$$

where i: an index of a scattered wave in each resolution (the i-th particle); and
$I^i$: a matrix containing an initial phase.

Because a distance $r^i(n+1)$ is the one which is acquired by adding $T_s v_i$ to an immediately preceding distance $r^i(n)$ to move the point at this distance, the distance $r_i(n+1)$ is expressed by the following equation (7).

$$r^i(n+1) = r^i(n) + T_s v_i \quad (7)$$

After calculating the reflected wave intensities $V_{hh}(n)$, $V_{vv}(n+1)$ and $V_{vh}(n+2)$, the reflected-wave intensity calculator 11 integrates the reflected wave intensities $V_{hh}(n)$, $V_{vv}(n+1)$ and $V_{vh}(n+2)$, thereby determining the radar reflectivity factor $Z_{hh}$ in the transmission of a horizontally polarized wave and the reception of a horizontally polarized wave, the radar reflectivity factor being the reflected wave intensity after the integration of the reflected wave intensity $V_{hh}(n)$, the radar reflectivity factor $Z_{vv}$ in the transmission of a vertically polarized wave and the reception of a vertically polarized wave, the radar reflectivity factor being the reflected wave intensity after the integration of the reflected wave intensity $V_{vv}(n+1)$, and the radar reflectivity factor $Z_{vh}$ in the transmission of a horizontally polarized wave and the reception of a vertically polarized wave, the radar reflectivity factor being the reflected wave intensity after the integration of the reflected wave intensity $V_{vh}(n+2)$.

The user is enabled to determine the range of this integration arbitrarily in consideration of the accuracy of the radar apparatus, etc. For example, it is assumed that the integration range is determined by both the length $T_s$ of each of the time intervals at which a polarized wave is transmitted and received by the transmission/reception device 1 and a known beam range provided by the transmission/reception device 1 (a range within which the radar is rotated).

The reflected-wave intensity calculator 11 also calculates the radar reflectivity factor difference Zdr which is the ratio of the radar reflectivity factor $Z_{hh}$ to the radar reflectivity factor $Z_{vv}$, as shown in the following equation (8).

$$Zdr[dB] = 10\log_{10}\left(\frac{Z_{hh}}{Z_{vv}}\right) \quad (8)$$

The reflected-wave intensity calculator 11 further outputs the radar reflectivity factors $Z_{hh}$ and $Z_{vh}$ to the linear-depolarization ratio calculator 12, and also displays the radar reflectivity factors $Z_{hh}$, $Z_{vv}$ and $Z_{vh}$ and the radar reflectivity factor difference Zdr on the display device 7.

When receiving the radar reflectivity factors $Z_{hh}$ and $Z_{vh}$ from the reflected-wave intensity calculator 11, the linear-depolarization ratio calculator 12 substitutes the radar reflectivity factors $Z_{hh}$ and $Z_{vh}$ into the following equation (9), to calculate the linear depolarization ratio $LDR_{vh}$ (step ST4).

$$LDR_{vh}[dB] = 10\log_{10}\left(\frac{Z_{vh}}{Z_{hh}}\right) \quad (9)$$

After calculating the linear depolarization ratio $LDR_{vh}$, the linear-depolarization ratio calculator 12 displays the linear depolarization ratio $LDR_{vh}$ on the display device 7.

When the reflected-wave intensity calculator 11 calculates the reflected wave intensities $V_{hh}$, $V_{vv}$ and $V_{vh}$, the velocity calculator 13 calculates the Doppler velocity v-hat of the observation object from the reflected wave intensities $V_{hh}$, $V_{vv}$ and $V_{vh}$ by using the pulse pair method (step ST5).

More specifically, the velocity calculator 13 calculates a lag R-hat($T_s$) of autocorrelation in each of transmission polarized waves at the time intervals of $T_s$ at which a polarized wave is repeatedly transmitted by the transmission/reception device 1, from the reflected wave intensities $V_{hh}$, $V_{vv}$ and $V_{vh}$ calculated by the reflected-wave intensity calculator 11, calculates a phase difference $\phi_{DP}$-hat between polarized waves repeatedly transmitted by the transmission/reception device 1 from the lag R-hat($T_s$), and calculates the Doppler velocity v-hat of the observation object from the lag R-hat ($T_s$), the phase difference $\phi_{DP}$-hat between polarized waves, and a Nyquist rate $v_a$ which indicates a range allowing the Doppler velocity v-hat to be observed.

Because the symbol "^" cannot be attached to the top of the character "R" and to the top of the character "ϕ" in the document of the description because of the restriction on an electronic application, "R" with "^" is denoted by "R-hat" and "ϕ" with "^" is denoted by "ϕ-hat" for convenience' sake.

Hereafter, the processing to calculate the Doppler velocity v-hat which is performed by the velocity calculator 13 will be explained concretely.

In the method (pulse pair method) of estimating autocorrelation in alternate transmission of polarized waves, the lag R-hat ($T_s$) is expressed by the following equation (10). In general, R-hat ($T_s$) is referred to as "lag 1", and R-hat($2T_s$) is referred to as "lag 2."

$$\hat{R}(T_s) = \frac{1}{3M}\sum_{i=0}^{M-1}(V^*_{hh(3i)}V_{vv(3i+1)} + V^*_{vv(3i+1)}V_{vh(3i+2)} + V^*_{vh(3i+2)}V_{vv(3i+3)}) \quad (10)$$

In the equation (10), M denotes the number of sample pairs (the number of hits in each of the following transmission/reception processing elements: the transmission of a horizontally polarized wave and the reception of a horizontally polarized wave, the transmission of a vertically polarized wave and the reception of a vertically polarized wave, and the transmission of a horizontally polarized wave and the reception of a vertically polarized wave (or the transmission of a vertically polarized wave and the reception of a horizontally polarized wave)).

R-hat($T_s$) shown in the equation (10) can be decomposed into three equations, as shown in the following equations (11) to (13). More specifically, $R_a$-hat ($T_s$), $R_b$-hat ($T_s$) and $R_c$-hat($T_s$) which are components of R-hat($T_s$) shown in the equation (10) can be specified.

$$\hat{R}_a(T_s) = \frac{1}{M}\sum_{i=0}^{M-1}V^*_{hh(3i)}V_{vv(3i+1)} \quad (11)$$

$$\hat{R}_b(T_s) = \frac{1}{M}\sum_{i=0}^{M-1}V^*_{vv(3i+1)}V_{vh(3i+2)} \quad (12)$$

$$\hat{R}_c(T_s) = \frac{1}{M}\sum_{i=0}^{M-1}V^*_{vh(3i+2)}V_{hh(3i+3)} \quad (13)$$

$R_a$-hat ($T_s$) denotes a covariance in terms of a horizontally polarized wave at a time of reception of a horizontally polarized wave, i.e., a covariance (first covariance) between horizontally polarized waves at times when the horizontally polarized waves are received through the first transmission/reception processing, and vertically polarized waves received through the second transmission/reception processing.

$R_b$-hat($T_s$) denotes a covariance in terms of a vertically polarized wave, i.e., a covariance (second covariance) between vertically polarized waves at times when the vertically polarized waves are received through the second transmission/reception processing, and vertically polarized waves received through the third transmission/reception processing.

$R_c$-hat ($T_s$) denotes a covariance in terms of a horizontally polarized wave at a time of reception of a vertically polarized wave, i.e., a covariance (third covariance) between vertically polarized waves at times when the vertically polarized waves are received through the third transmission/reception processing, and horizontally polarized waves received through the first transmission/reception processing.

As a result, R-hat ($T_s$) shown in the equation (10) is expressed by the following equation (14).

$$\hat{R}(T_s) = \frac{1}{3}[\hat{R}_a(T_s) + \hat{R}_b(T_s) + \hat{R}_c(T_s)] \quad (14)$$

By using the reflected wave intensity $V_{hh}$ (n) shown in the equation (4) and the reflected wave intensity $V_{vv}$(n+1) shown in the equation (5), $R_a$-hat($T_s$) shown in the equation (11) is expressed by the following equation (15).

$$\hat{R}_a(T_s) = \langle V_{hh(n)}^* V_{vh(n+1)} \rangle \tag{15}$$

$$= \left(\frac{\lambda G}{4\pi r^2} \sum_i S_{hh}^i I^i e^{-2j(k_0+k_h)r^i(n)}\right)_*$$

$$\left(\frac{\lambda G}{4\pi r^2} \sum_l S_{vv}^l I^l e^{-2j(k_0+k_v)r^l(n+1)}\right)$$

$$= \left(\frac{\lambda G}{4\pi r^2}\right)^2 \sum_i \sum_l \langle S_{hh}^{*i} S_{vh}^i I^{*i} I^l \rangle \times \langle \exp\{2j(k_0 +$$

$$k_h)r^i(n) - 2j(k_0+k_v)r^l(n+1)\}\rangle$$

$$= \left(\frac{\lambda G}{4\pi r^2}\right)^2 \sum_i \sum_l \langle S_{hh}^{*i} S_{vv}^i I^{*i} I^l \rangle \times$$

$$\langle \exp\{2j(k_0+k_h)r^i(n) - 2j((k_0+k_v)r^l(n) +$$

$$(k_0+k_v)T_s v_l)\}\rangle$$

In this equation, because 2 $(k_0+k_h)r^i(n)$ which is a phase is uniformly distributed in the range from 0 to $2\pi$, the expected value of the exponential portion in the equation (15) is zero in cases other than the case of i=1.

Therefore, $R_a$-hat ($T_s$) shown in the equation (15) is expressed by the following equation (16).

$$\hat{R}_a(T_s) = \tag{16}$$

$$\left(\frac{\lambda G}{4\pi r^2}\right)^2 \sum_i \langle S_{hh}^{*i} S_{vh}^i \rangle |I^i|^2 \times \langle \exp[j[2(k_h-k_v)r^i(n) - 2(k_0+k_v)T_s v_i]]\rangle$$

Because when $r^i$ (n) in the equation (16) is averaged, the average is the midpoint among all the distances, $r^i$ (n) can be set as $r_0$ (middle distance). Further, because when $v_i$ is averaged, the average is the one of all the velocities, $v_i$ can be set as v (average velocity).

$$\hat{R}_a(T_s) = \tag{17}$$

$$\left(\frac{\lambda G}{4\pi r^2}\right)^2 \sum_i \langle S_{hh}^{*i} S_{vv}^i \rangle |I^i|^2 \times \exp\{j[2(k_h-k_v)r_0 - 2(k_0+k_v)T_s v]\}$$

Because $2(k_h-k_v) r_0$ is equal to the phase difference $\phi_{DP}$ between a horizontally polarized wave and a vertically polarized wave in the equation (17), $2(k_h-k_v) r_0=\phi_{DP}$. Further, because $-2(k_0+k_v) T_s v$ is equal to the amount of Doppler shifts $\psi d$ of a vertically polarized wave, $-2(k_0+k_v) T_s v=\psi_d$.

Further, because this embodiment is based on the assumption that the amount of Doppler shift of a horizontally polarized wave and the amount of Doppler shift of a vertically polarized wave do not change, $-2(k_0+k_h) T_s v=\psi_d$.

As a result, $R_a$-hat ($T_s$) is expressed by the following equation (18).

$$\hat{R}_a(T_s) = \left(\frac{\lambda G}{4\pi r^2}\right)^2 \sum_i \langle S_{hh}^{*i} S_{vv}^i \rangle |I^i|^2 \times \exp\{j[\phi_{DP} + \psi_d]\} \tag{18}$$

By using the reflected wave intensity $V_{vv}$ (n+1) shown in the equation (5) and the reflected wave intensity $V_{vh}$ (n+2) shown in the equation (6), $R_b$-hat($T_s$) shown in the equation (12) is expressed by the following equation (19).

$$\hat{R}_b(T_s) = \langle V_{vv(n+1)}^* V_{vh(n+2)} \rangle \tag{19}$$

$$= \left(\frac{\lambda G}{4\pi r^2} \sum_i S_{vv}^i I^i e^{-2j(k_0+k_v)r^i(n+1)}\right)_*$$

$$\left(\frac{\lambda G}{4\pi r^2} \sum_i S_{vh}^i I^i e^{-j(k_0+k_h+k_v)r^i(n+2)}\right)$$

$$= \left(\frac{\lambda G}{4\pi r^2}\right)^2 \sum_i \sum_l \langle S_{vv}^{*i} S_{vh}^i I^{*i} I^l \rangle \times \langle \exp\{2j(k_0 +$$

$$k_v)r^i(n+1) - j(2k_0+k_h+k_v)r^i(n+2)\}\rangle$$

$$= \left(\frac{\lambda G}{4\pi r^2}\right)^2 \sum_i \langle S_{vv}^{*i} S_{vh}^i \rangle |I^i|^2 \times \langle \exp\{2j(k_0 +$$

$$k_v)r^i(n+1) - j(2k_0+k_h+k_v)r^i(n+2)\}\rangle$$

$$= \left(\frac{\lambda G}{4\pi r^2}\right)^2 \sum_i \langle S_{vv}^{*i} S_{vh}^i \rangle |I^i|^2 \times \langle \exp\{2j(k_0+k_v)r^i$$

$$(n+1) - j(2k_0+k_h+k_v)r^i(n+1) - j(2k_0 +$$

$$k_h+k_v)T_s v_i\}\rangle$$

$$= \left(\frac{\lambda G}{4\pi r^2}\right)^2 \sum_i \langle S_{vv}^{*i} S_{vh}^i \rangle |I^i|^2 \times \langle \exp\{j[(k_v-k_h)r^i$$

$$(n+1) - (2k_0+k_h+k_v)T_s v_i]\}\rangle$$

$$= \left(\frac{\lambda G}{4\pi r^2}\right)^2 \sum_i \langle S_{vv}^{*i} S_{vh}^i \rangle |I^i|^2 \times \langle \exp\{j[(k_v-k_h)r_0 -$$

$$(2k_0+k_h+k_v)T_s v]\}$$

$R_b$-hat ($T_s$) shown in the equation (19) is expressed by the following equation (20), by using $\phi_{DP}=2 (k_h-k_v) r_0$, $\psi_d=-2 (k_0+k_v) T_s v$ and $\psi_d=-2 (k_0+k_h) T_s v$.

$$\hat{R}_b(T_s) = \left(\frac{\lambda G}{4\pi r^2}\right)^2 \sum_i \langle S_{vv}^{*i} S_{vh}^i \rangle |I^i|^2 \times \exp\left\{j\left[-\frac{1}{2}\phi_{DP} + \psi_d\right]\right\} \tag{20}$$

By using the reflected wave intensity $V_{hh}$ (n) shown in the equation (4) and the reflected wave intensity $V_{vh}$ (n+2) shown in the equation (6), $R_c$-hat ($T_s$) shown in the equation (13) is expressed by the following equation (21).

$$\hat{R}_c(T_s) = \langle V_{vh(n+2)}^* V_{hh(n+3)} \rangle \tag{21}$$

$$= \left(\frac{\lambda G}{4\pi r^2} \sum_i S_{vh}^i I^i e^{-j(2k_0+k_h+k_v)r^i(n+2)}\right)_*$$

$$\left(\frac{\lambda G}{4\pi r^2} \sum_i S_{hh}^i I^i e^{-2j(k_0+k_h)r^i(n+3)}\right)$$

$$= \left(\frac{\lambda G}{4\pi r^2}\right)^2 \sum_i \sum_l \langle S_{vh}^{*i} S_{hh}^i I^{*i} I^l \rangle \times \langle \exp\{j(2k_0 +$$

$$k_h+k_v)r^i(n+2) - 2j(k_0+k_h)r^l(n+3)\}\rangle$$

$$= \left(\frac{\lambda G}{4\pi r^2}\right)^2 \sum_i \langle S_{vh}^{*i} S_{hh}^i \rangle |I^i|^2 \times \langle \exp\{j(2k_0 +$$

$$k_h+k_v)r^i(n+2) - 2j(k_0+k_h)r^i(n+3)\}\rangle$$

-continued $$= \left(\frac{\lambda G}{4\pi r^2}\right)^2 \sum_i \langle S_{vh}^{*i} S_{hh}^i \rangle |I^i|^2 \times \langle \exp\{j(2k_0 + k_h + k_v)r^i$$

$$(n+2) - 2j(k_0 + k_h)r^i(n+2) - 2j(k_0 +$$

$$k_h)T_s v_i\})$$

$$= \left(\frac{\lambda G}{4\pi r^2}\right)^2 \sum_i \langle S_{vh}^{*i} S_{hh}^i \rangle |I^i|^2 \times \langle \exp\{j[(k_v - k_h)r^i$$

$$(n+2) - 2(k_0 + k_h)T_s v_i]\} \rangle$$

$$= \left(\frac{\lambda G}{4\pi r^2}\right)^2 \sum_i \langle S_{vh}^{*i} S_{hh}^i \rangle |I^i|^2 \times \langle \exp\{j[(k_v - k_h)r_0 -$$

$$2(k_0 + k_h)T_s v]\}$$

$R_a$-hat $(T_s)$ shown in the equation (21) is expressed by the following equation (22), by using $\phi_{DP} = 2(k_h - k_v)r_0$ and $\psi_d = -2(k_0 + k_h)T_s v$.

$$\hat{R}_c(T_s) = \left(\frac{\lambda G}{4\pi r^2}\right)^2 \sum_i \langle S_{vh}^{*i} S_{hh}^i \rangle |I^i|^2 \times \exp\left\{j\left[-\frac{1}{2}\phi_{DP} + \psi_d\right]\right\} \quad (22)$$

Figure 7:
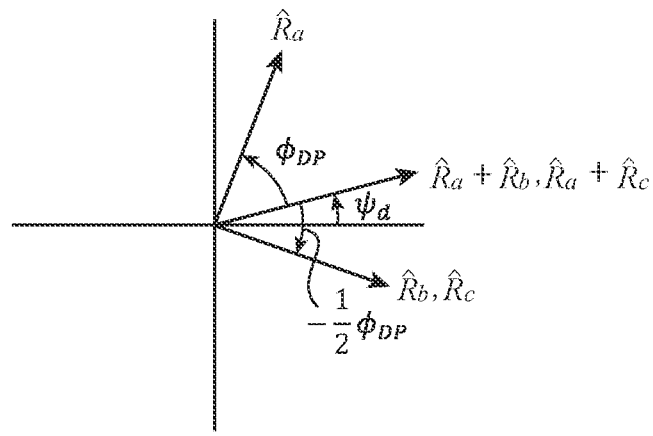
FIG. 7 is an explanatory drawing showing a relation among the phases of $R_a$-hat $(T_s)$, $R_b$-hat $(T_s)$ and $R_c$-hat $(T_s)$, which is seen from equations (18), (20) and (22)

FIG. 7 is an explanatory drawing showing a relation among the phases of $R_a$-hat $(T_s)$ $R_b$-hat $(T_s)$ and $R_c$-hat $(T_s)$, which is seen from the equations (18), (20) and (22). In the example shown in FIG. 7, for the sake of simplicity of the drawing, the description of $(T_s)$ is omitted, and $R_a$-hat $(T_s)$, $R_b$-hat $(T_s)$ and $R_c$-hat $(T_s)$ will be expressed as $R_a$-hat, $R_b$-hat and $R_c$-hat, respectively.

As shown in FIG. 7, the difference in phase between $R_a$-hat and either $(R_a$-hat$+R_b$-hat$)$ or $(R_a$-hat$+R_c$-hat$)$ is $\phi_{DP}$, and the difference in phase between either $(R_a$-hat$+R_b$-hat$)$ or $(R_a$-hat$+R_c$-hat$)$ and either $R_b$-hat or $R_c$-hat is $\phi_{DP}/2$.

Further, the phases of $(R_a$-hat$+R_b$-hat$)$ and $(R_a$-hat$+R_c$-hat$)$ are $\psi_d$.

As a result, the phase difference $\phi_{DP}$-hat between polarized waves repeatedly transmitted by the transmission/reception device 1 is expressed by either two-thirds of the argument between $R_a$-hat $(T_s)$ and $R_b$-hat $(T_s)$ or two-thirds of the argument between $R_a$-hat $(T_a)$ and $R_c$-hat$(T_s)$.

More specifically, the phase difference $\phi_{DP}$-hat between polarized waves repeatedly transmitted by the transmission/reception device 1 is expressed by the following equation (23).

$$\hat{\phi}_{DP} = 2arg(\hat{R}_a(T_s)\hat{R}_b^*(T_s))/3 = 2arg(\hat{R}_a(T_s)\hat{R}_c^*(T_s))/3 \quad (23)$$

In this regard, the example in which the velocity calculator 13 calculates, as the phase difference $\phi_{DP}$-hat between polarized waves repeatedly transmitted by the transmission/reception device 1, either two-thirds of the argument between $R_a$-hat $(T_s)$ and $R_b$-hat $(T_s)$, or two-thirds of the argument between $R_a$-hat $(T_s)$ and $R_c$-hat $(T_s)$ is shown. Instead, the velocity calculator can calculate, as the phase difference $\phi_{DP}$-hat between polarized waves repeatedly transmitted by the transmission/reception device 1, the average of two-thirds of the argument between $R_a$-hat $(T_s)$ and $R_b$-hat $(T_s)$ and two-thirds of the argument between $R_a$-hat $(T_s)$ and $R_c$-hat $(T_s)$, as shown in the following equation (24).

$$\hat{\phi}_{DP} = 2arg(\hat{R}_a(T_s)\hat{R}_b^*(T_s))/3 = 2arg(\hat{R}_a(T_s)\hat{R}_c^*(T_s))/3\}/2 \quad (24)$$

After calculating the phase difference $\phi_{DP}$-hat between polarized waves, the velocity calculator 13 calculates the Doppler velocity v-hat of the observation object from $R_a$-hat $(T_s)$ contained in the lag R-hat $(T_s)$, the phase difference $\phi_{DP}$-hat between polarized waves, and the Nyquist rate $v_a$ which indicates the range allowing the Doppler velocity v-hat to be observed, as shown in the following equation (25).

$$\hat{v} = -\frac{v_a}{\pi}\arg[\exp(j\psi_d)] = -\frac{v_a}{\pi}\arg[\hat{R}_a\exp(-j\hat{\phi}_{DP})] \quad (25)$$

In this embodiment, the equation (25) is the same as a formula for calculating the Doppler velocity v-hat in a case in which either processing to transmit a single polarized wave and receive a single polarized wave or processing to concurrently transmit polarized waves and concurrently receive polarized waves is performed, and the Nyquist rate $v_a$ which indicates the range allowing the Doppler velocity v-hat to be observed is recovered to a Nyquist rate which is the same as that in the case in which either processing to transmit a single polarized wave and receive a single polarized wave or processing to concurrently transmit polarized waves and concurrently receive polarized waves is performed.

Therefore, even when the three types of polarized-wave transmission/reception processing elements are repeatedly performed, the Doppler velocity v-hat of the observation object can be calculated at the Nyquist rate which is the same as that in the case in which either processing to transmit a single polarized wave and receive a single polarized wave or processing to concurrently transmit polarized waves and concurrently receive polarized waves is performed.

As can be seen from the above description, Embodiment 1 is configured to include the linear-depolarization ratio calculator 12 determines the radar reflectivity factor $Z_{hh}$ in the transmission of a horizontally polarized wave and the reception of a horizontally polarized wave, the radar reflectivity factor being the reflected wave intensity after the integration of the reflected wave intensity $V_{hh}(n)$ calculated by the reflected-wave intensity calculator 11, and the radar reflectivity factor $Z_{vh}$ in the transmission of a horizontally polarized wave and the reception of a vertically polarized wave, the radar reflectivity factor being the reflected wave intensity after the integration of the reflected wave intensity $V_{vh}(n+2)$, and calculate the linear depolarization ratio $LDR_{vh}$ which is the ratio between the radar reflectivity factor $Z_{hh}$ and the radar reflectivity factor $Z_{vh}$. Thus, there is provided an advantage of being able to calculate the linear depolarization ratio $LDR_{vh}$ while preventing the Nyquist rate $v_a$ from decreasing, even when the three types of polarized-wave transmission/reception processing elements are repeatedly performed.

In this Embodiment 1, the example in which the transmission/reception device 1 performs "the transmission of a horizontally polarized wave and the reception of a horizontally polarized wave" which is the first transmission/reception processing, "the transmission of a vertically polarized wave and the reception of a vertically polarized wave" which is the second transmission/reception processing, and "the transmission of a horizontally polarized wave and the reception of a vertically polarized wave" which is the third transmission/reception processing is shown. Instead, the transmission/reception device can perform "the transmission of a horizontally polarized wave and the reception of a horizontally polarized wave" which is the first transmission/reception processing, "the transmission of a vertically polarized wave and the reception of a vertically polarized wave" which is the second transmission/reception processing, and "the transmission of a vertically polarized wave and the reception of a horizontally polarized wave" which is the fourth transmission/reception processing.

In this case, instead of calculating the sum total of the voltages of the backward scattered received signals which are the digital received signals of vertically polarized waves received through the third transmission/reception processing multiple times, i.e., the reflected wave intensity $V_{vh}$ (n+2) in the (n+2)-th sample, the reflected-wave intensity calculator 11 calculates the sum total of the voltages of the backward scattered received signals which are the digital received signals of horizontally polarized waves received through the fourth transmission/reception processing multiple times, i.e., a reflected wave intensity $V_{hv}$(n+2) in the (n+2)-th sample, as shown in the following equation (26).

$$V_{hv(n+2)} = \frac{\lambda G}{4\pi r^2} \sum_i S_{hv}^i I^i e^{(\lambda_1+\lambda_2)r^i(n+2)} = \frac{\lambda G}{4\pi r^2} \sum_i S_{hv}^i I^i e^{-j(2k_0+k_h+k_v)r^i(n+2)} \quad (26)$$

The reflected-wave intensity calculator 11 also integrates the reflected wave intensity $V_{hv}$(n+2), thereby determining the radar reflectivity factor $Z_{hv}$ in the transmission of a vertically polarized wave and the reception of a horizontally polarized wave, the radar reflectivity factor being the reflected wave intensity after the integration of the reflected wave intensity $V_{hv}$(n+2).

Although the user can determine this integral range arbitrarily in consideration of the accuracy of the radar apparatus, etc., it is assumed that, for example, the integral range is determined from the length $T_s$ of each of the time intervals at which a polarized wave is transmitted and received by the transmission/reception device 1 and a known beam range provided by the transmission/reception device 1 (a range within which the radar is rotated).

In addition, the reflected-wave intensity calculator 11 outputs the radar reflectivity factors $Z_{vv}$ and $Z_{hv}$ to the linear-depolarization ratio calculator 12, and also displays the radar reflectivity factors $Z_{hh}$, $Z_{vv}$ and $Z_{hv}$ and the radar reflectivity factor difference Zdr on the display device 7.

When receiving the radar reflectivity factors $Z_{vv}$ and $Z_{hv}$ from the reflected-wave intensity calculator 11, the linear-depolarization ratio calculator 12 substitutes the radar reflectivity factors $Z_{vv}$ and $Z_{hv}$ into the following equation (27), to calculate the linear depolarization ratio $LDR_{hv}$.

$$LDR_{hv}[dB] = 10\log_{10}\left(\frac{Z_{hv}}{Z_{vv}}\right) \quad (27)$$

After calculating the linear depolarization ratio $LDR_{hv}$, the linear-depolarization ratio calculator 12 displays the linear depolarization ratio $LDR_{hv}$ on the display device 7.

When the reflected-wave intensity calculator 11 calculates the reflected wave intensities $V_{hh}$, $V_{vv}$ and $Vh_{hv}$, the velocity calculator 13 calculates the Doppler velocity v-hat of the observation object from the reflected wave intensities $V_{hh}$, $V_{vv}$ and $V_{hv}$ by using the pulse pair method.

More specifically, the velocity calculator 13 calculates the lag R-hat ($T_s$) of the autocorrelation in each of transmission polarized waves at the time intervals of $T_s$ at which a polarized wave is repeatedly transmitted by the transmission/reception device 1 from the reflected wave intensities $V_{hh}$, $V_{vv}$ and $V_{hv}$ calculated by the reflected-wave intensity calculator 11, calculates the phase difference $\phi_{DP}$-hat between polarized waves repeatedly transmitted by the transmission/reception device 1 from the lag R-hat ($T_s$), and calculates the Doppler velocity v-hat of the observation object from the lag R-hat ($T_s$), the phase difference $\phi_{DP}$-hat between polarized waves, and the Nyquist rate $v_a$.

When the Doppler velocity v-hat is calculated using the reflected wave intensities calculated by the reflected-wave intensity calculator 11, the lag R-hat ($T_s$) is expressed, in the method (pulse pair method) of estimating the autocorrelation in the alternate transmission of polarized waves, by the following equation (28).

$$\hat{R}(T_s) = \frac{1}{3M} \sum_{i=0}^{M-1} (V_{hh(3i)}^* V_{vv(3i+1)} + V_{vv(3i+1)}^* V_{hv(3i+2)} + V_{hv(3i+2)}^* V_{vv(3i+3)}) \quad (28)$$

R-hat ($T_s$) shown in the equation (28) can be decomposed into three equations, as shown in the above-mentioned equations (11) and (12) and the following equation (29). More specifically, $R_a$-hat ($T_s$), $R_b$-hat ($T_s$) and $R_c$-hat ($T_s$), which are components of R-hat ($T_s$) shown in the equation (28), can be specified.

$$\hat{R}_c(T_s) = \frac{1}{M} \sum_{i=0}^{M-1} V_{hv(3i+2)}^* V_{hh(3i+3)} \quad (29)$$

$R_a$-hat ($T_s$) denotes a covariance in terms of a vertically polarized wave at a time of reception of a horizontally polarized wave, i.e., a covariance (fourth covariance) between horizontally polarized waves at times when the horizontally polarized waves are received through the fourth transmission/reception processing, and horizontally polarized waves received through the first transmission/reception processing.

By using the reflected wave intensity $V_{hh}$ (n) shown in the equation (4) and the reflected wave intensity $V_{hv}$(n+2) shown in the equation (26), $R_c$-hat ($T_s$) shown in the equation (29) is expressed by the following equation (30).

$$\hat{R}_c(T_s) = \langle V_{hv(n+2)}^* V_{hh(n+3)} \rangle \quad (30)$$

$$= \left(\frac{\lambda G}{4\pi r^2} \sum_i S_{hv}^i I^i e^{-j(2k_0+k_h+k_v)r^i(n+2)}\right)_*$$

$$\left(\frac{\lambda G}{4\pi r^2} \sum_l S_{hh}^l I^l e^{-2j(k_0+k_h)r^l(n+3)}\right)$$

$$= \left(\frac{\lambda G}{4\pi r^2}\right)^2 \sum_i \sum_l \langle S_{hv}^{*i} S_{hh}^l I^{*i} I^l \rangle \times \langle \exp\{j(2k_0 + k_h + k_v)r^i(n+2) - 2j(k_0+k_h)r^l(n+3)\}\rangle$$

$$= \left(\frac{\lambda G}{4\pi r^2}\right)^2 \sum_i \langle S_{hv}^{*i} S_{hh}^i \rangle |I^i|^2 \times \langle \exp\{j(2k_0 + k_h + k_v)r^i(n+2) - 2j(k_0+k_h)r^i(n+3)\}\rangle$$

$$= \left(\frac{\lambda G}{4\pi r^2}\right)^2 \sum_i \langle S_{hv}^{*i} S_{hh}^i \rangle |I^i|^2 \times \langle \exp\{j(2k_0 + k_h + k_v)r^i$$

$$(n+2) - 2j(k_0+k_h)r^i(n+2) - 2j(k_0 +$$

-continued $$k_h)T_s v_i\})$$

$$= \left(\frac{\lambda G}{4\pi r^2}\right)^2 \sum_i \langle S_{hv}^{*i} S_{hh}^i \rangle |I^i|^2 \times \langle \exp\{j[(k_v - k_h)r^i$$

$$(n+2) - 2(k_0 + k_h)T_s v_i]\}\rangle$$

$$= \left(\frac{\lambda G}{4\pi r^2}\right)^2 \sum_i \langle S_{hv}^{*i} S_{hh}^i \rangle |I^i|^2 \times \langle \exp\{j[(k_v - k_h)r_0 -$$

$$2(k_0 + k_h)T_s v]\}$$

$\hat{R}_c$-hat ($T_s$) shown in the equation (30) is expressed by the following equation (31), by using $\phi_{DP}=2(k_h-k_v)r_0$ and $\psi_d=-2(k_0+k_h)T_s v$.

$$\hat{R}_c(T_s) = \left(\frac{\lambda G}{4\pi r^2}\right)^2 \sum_i \langle S_{hv}^{*i} S_{hh}^i \rangle |I^i|^2 \times \exp\left\{j\left[-\frac{1}{2}\phi_{DP} + \psi_d\right]\right\} \quad (22)$$

The details of subsequent processes performed by the velocity calculator 13 are the same as those in the case in which "the transmission of a horizontally polarized wave and the reception of a vertically polarized wave" which is the third transmission/reception processing is performed.

Embodiment 2

Although in above-mentioned Embodiment 1, the example in which the transmission/reception device 1 performs either "the transmission of a horizontally polarized wave and the reception of a vertically polarized wave" which is the third transmission/reception processing or "the transmission of a vertically polarized wave and the reception of a horizontally polarized wave" which is the fourth transmission/reception processing is shown, the transmission/reception device 1 can repeatedly perform the four types of polarized-wave transmission/reception processing elements by performing both "the transmission of a horizontally polarized wave and the reception of a vertically polarized wave" which is the third transmission/reception processing, and "the transmission of a vertically polarized wave and the reception of a horizontally polarized wave" which is the fourth transmission/reception processing.

Figure 8:
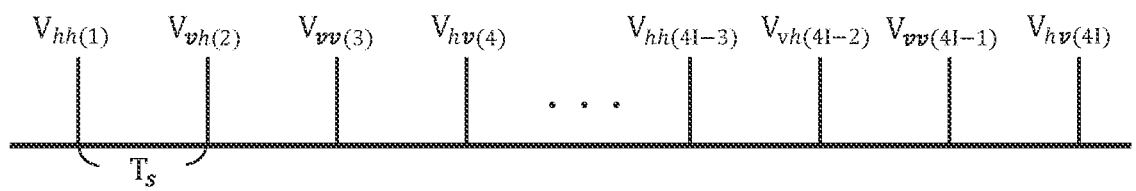
FIG. 8 is an explanatory drawing showing an example in which the length of each of time intervals at which a polarized wave is transmitted and received by the transmission/reception device 1 is $T_s$.

FIG. 8 is an explanatory drawing showing an example in which the length of each of time intervals at which a polarized wave is transmitted and received by a transmission/reception device 1 is $T_s$.

In the example shown in FIG. 8, "transmission of a horizontally polarized wave and reception of a horizontally polarized wave" which is first transmission/reception processing is performed at a time of $(4i-3) \cdot T_s$, "transmission of a horizontally polarized wave and reception of a vertically polarized wave" which is third transmission/reception processing is performed at a time of $(4i-2) \cdot T_s$, "transmission of a vertically polarized wave and reception of a vertically polarized wave" which is second transmission/reception processing is performed at a time of $(4i-1) \cdot T_s$, and "transmission of a vertically polarized wave and reception of a horizontally polarized wave" which is fourth transmission/reception processing is performed at a time of $4i \cdot T_s$.

In this regard, i=1, 2, 3, . . . , and I.

I denotes the number of sample pairs (the number of hits in each of the following transmission/reception processing elements: the transmission of a horizontally polarized wave and the reception of a horizontally polarized wave, the transmission of a vertically polarized wave and the reception of a vertically polarized wave, the transmission of a horizontally polarized wave and the reception of a vertically polarized wave, and the transmission of a vertically polarized wave and the reception of a horizontally polarized wave).

More specifically, in the example shown in FIG. 8, the order in which the processing elements are in turn executed is as follows: "the transmission of a horizontally polarized wave and the reception of a horizontally polarized wave"→"the transmission of a horizontally polarized wave and the reception of a vertically polarized wave"→"the transmission of a vertically polarized wave and the reception of a vertically polarized wave"→"the transmission of a vertically polarized wave and the reception of a horizontally polarized wave."

A block diagram showing a dual polarization radar apparatus according to Embodiment 2 is the same as that of FIG. 1 showing the dual polarization radar apparatus according to above-mentioned Embodiment 1.

Next, operations will be explained.

Because a transmitter 2 of the transmission/reception device 1 performs the transmission/reception processing elements in the following order: "the transmission of a horizontally polarized wave and the reception of a horizontally polarized wave"→"the transmission of a horizontally polarized wave and the reception of a vertically polarized wave"→"the transmission of a vertically polarized wave and the reception of a vertically polarized wave"→"the transmission of a vertically polarized wave and the reception of a horizontally polarized wave", the transmitter transmits a horizontally polarized wave→a horizontally polarized wave→a vertically polarized wave→a vertically polarized wave→a horizontally polarized wave→a horizontally polarized wave→a vertically polarized wave→a vertically polarized wave→ . . . →a horizontally polarized wave→a horizontally polarized wave→a vertically polarized wave→a vertically polarized wave at transmission time intervals of $T_s$.

When receiving either a horizontally polarized wave or a vertically polarized wave from the transmitter 2, a transmission-reception switch 3 outputs either the horizontally polarized wave or the vertically polarized wave to an antenna 4.

When receiving either the horizontally polarized wave or the vertically polarized wave from the transmission-reception switch 3, the antenna 4 emits either the horizontally polarized wave or the vertically polarized wave toward space.

After emitting either the horizontally polarized wave or the vertically polarized wave toward space, the antenna 4 receives either a horizontally polarized wave or a vertically polarized wave which is reflected by raindrops which are an observation object and then returns thereto.

In the example shown in FIG. 8, the antenna receives a horizontally polarized wave→a vertically polarized wave→a vertically polarized wave→a horizontally polarized wave →a horizontally polarized wave→a vertically polarized wave →a vertically polarized wave→a horizontally polarized wave → . . . →a horizontally polarized wave→a vertically polarized wave→a vertically polarized wave→a horizontally polarized wave at reception time intervals of $T_s$.

The transmission-reception switch 3 outputs either the horizontally polarized wave or the vertically polarized wave received by the antenna 4 to a receiver 5.

The receiver 5 performs processing to receive either the horizontally polarized wave or the vertically polarized wave received by the antenna 4, convert an analog received signal of either the horizontally polarized wave or the vertically polarized wave into a digital received signal, and output the digital received signal to a signal processing device 6.

A reflected-wave intensity calculator 11 of the signal processing device 6 calculates a reflected wave intensity $V_{hh}$ which is the power value of a horizontally polarized wave received through the first transmission/reception processing by the transmission/reception device 1, from the digital received signal of the horizontally polarized wave, and also calculates a reflected wave intensity $V_{vh}$ which is the power value of a vertically polarized wave received through the third transmission/reception processing, from the digital received signal of the vertically polarized wave.

The reflected-wave intensity calculator further calculates a reflected wave intensity $V_{vv}$ which is the power value of a vertically polarized wave received through the second transmission/reception processing, from the digital received signal of the vertically polarized wave, and also calculates a reflected wave intensity $V_{hv}$ which is the power value of a horizontally polarized wave received through the fourth transmission/reception processing, from the digital received signal of the horizontally polarized wave.

Hereafter, the processing to calculate the reflected wave intensities $V_{hh}$, $V_{vh}$, $V_{vv}$ and $V_{hv}$, which is performed by the reflected-wave intensity calculator 11, will be explained concretely.

The reflected-wave intensity calculator 11 calculates the sum total of the voltages of the backward scattered received signals which are the digital received signals of horizontally polarized waves received through the first transmission/reception processing multiple times, i.e., the reflected wave intensity $V_{hh}(n)$ in the n-th sample, as shown in the following equation (32).

The reflected-wave intensity calculator 11 also calculates the sum total of the voltages of the backward scattered received signals which are the digital received signals of vertically polarized waves received through the third transmission/reception processing multiple times, i.e., the reflected wave intensity $V_{vh}(n+1)$ in the (n+1)-th sample, as shown in the following equation (33).

The reflected-wave intensity calculator 11 calculates the sum total of the voltages of the backward scattered received signals which are the digital received signals of vertically polarized waves received through the second transmission/reception processing multiple times, i.e., the reflected wave intensity $V_{vv}(n+2)$ in the (n+2)-th sample, as shown in the following equation (34).

The reflected-wave intensity calculator 11 further calculates the sum total of the voltages of the backward scattered received signals which are the digital received signals of horizontally polarized waves received through the fourth transmission/reception processing multiple times, i.e., the reflected wave intensity $V_{hv}(n+3)$ in the (n+3)-th sample, as shown in the following equation (35). These reflected wave intensities are calculated for each of divisions (grid points) of an azimuthal angle with respect to an observation region, and a distance.

$$V_{hh(n)} = \frac{\lambda G}{4\pi r^2} \sum_i S^i_{hh} I^i e^{2\lambda_1 r^i(n)} = \frac{\lambda G}{4\pi r^2} \sum_i S^i_{hh} I^i e^{-2j(k_0+k_h)r^i(n)} \quad (32)$$

$$V_{vh(n+1)} = \quad (33)$$
$$\frac{\lambda G}{4\pi r^2} \sum_i S^i_{vh} I^i e^{(\lambda_1+\lambda_2)r^i(n+1)} = \frac{\lambda G}{4\pi r^2} \sum_i S^i_{vh} I^i e^{-j(2k_0+k_h+k_v)r^i(n+1)}$$

$$V_{vv(n+2)} = \frac{\lambda G}{4\pi r^2} \sum_i S^i_{vv} I^i e^{2\lambda_2 r^i(n+2)} = \frac{\lambda G}{4\pi r^2} \sum_i S^i_{vv} I^i e^{-2j(k_0+k_v)r^i(n+2)} \quad (34)$$

$$V_{hv(n+3)} = \quad (35)$$
$$\frac{\lambda G}{4\pi r^2} \sum_i S^i_{hv} I^i e^{(\lambda_1+\lambda_2)r^i(n+3)} = \frac{\lambda G}{4\pi r^2} \sum_i S^i_{hv} I^i e^{-j(2k_0+k_h+k_v)r^i(n+3)}$$

After calculating the reflected wave intensities $V_{hh}(n)$, $V_{vh}(n+1)$, $V_{vv}(n+2)$ and $V_{hv}(n+3)$, the reflected-wave intensity calculator 11 integrates the reflected wave intensities $V_{hh}(n)$, $V_{vh}(n+1)$, $V_{vv}(n+2)$ and $V_{hv}(n+3)$, thereby determining a radar reflectivity factor $Z_{hh}$ in the transmission of a horizontally polarized wave and the reception of a horizontally polarized wave, the radar reflectivity factor being the reflected wave intensity after the integration of the reflected wave intensity $V_{hh}(n)$, a radar reflectivity factor $Z_{vh}$ in the transmission of a horizontally polarized wave and the reception of a vertically polarized wave, the radar reflectivity factor being the reflected wave intensity after the integration of the reflected wave intensity $V_{vh}(n+1)$, a radar reflectivity factor $Z_{vv}$ in the transmission of a vertically polarized wave and the reception of a vertically polarized wave, the radar reflectivity factor being the reflected wave intensity after the integration of the reflected wave intensity $V_{vv}(n+2)$, and a radar reflectivity factor $Z_{hv}$ in the transmission of a vertically polarized wave and the reception of a horizontally polarized wave, the radar reflectivity factor being the reflected wave intensity after the integration of the reflected wave intensity $V_{hv}(n+3)$.

The user is enabled to determine the range of this integration arbitrarily in consideration of the accuracy of the radar apparatus, etc. For example, it is assumed that the integration range is determined by both the length $T_s$ of each of the time intervals at which a polarized wave is transmitted and received by the transmission/reception device 1 and a known beam range provided by the transmission/reception device 1 (a range within which the radar is rotated).

The reflected-wave intensity calculator 11 also calculates a radar reflectivity factor difference Zdr which is the ratio of the radar reflectivity factor $Z_{hh}$ to the radar reflectivity factor $Z_{vv}$, as shown in the above-mentioned equation (8).

The reflected-wave intensity calculator 11 further outputs the radar reflectivity factors $Z_{hh}$, $Z_{vh}$, $Z_{vv}$ and $Z_{hv}$ to a linear-depolarization ratio calculator 12, and also displays the radar reflectivity factors $Z_{hh}$, $Z_{vh}$, $Z_{vv}$ and $Z_{hv}$, and the radar reflectivity factor difference Zdr on a display device 7.

When receiving the radar reflectivity factors $Z_{hh}$, $Z_{vh}$, $Z_{vv}$ and $Z_{hv}$ from the reflected-wave intensity calculator 11, the linear-depolarization ratio calculator 12 substitutes the radar reflectivity factors $Z_{hh}$ and $Z_{vh}$ into the following equation (36), to calculate a linear depolarization ratio $LDR_{vh}$.

$$LDR_{vh}[\text{dB}] = 10\log_{10}\left(\frac{Z_{vh}}{Z_{hh}}\right) \quad (36)$$

The linear-depolarization ratio calculator 12 also substitutes the radar reflectivity factors $Z_{vv}$ and $Z_{hv}$ into the following equation (37), to calculate a linear depolarization ratio $LDR_{hv}$.

$$LDR_{hv}[\text{dB}] = 10\log_{10}\left(\frac{Z_{hv}}{Z_{vv}}\right) \quad (37)$$

After calculating the linear depolarization ratios $LDR_{vh}$ and $LDR_{hv}$, the linear-depolarization ratio calculator 12 displays the linear depolarization ratios $LDR_{vh}$ and $LDR_{hv}$ on the display device 7.

When the reflected-wave intensity calculator 11 calculates the reflected wave intensities $V_{hh}$ (n), $V_{vh}$ (n+1), $V_{vv}$ (n+2) and $V_{hv}$ (n+3), a velocity calculator 13 calculates the Doppler velocity v-hat of the observation object from the reflected wave intensities $V_{hh}$ (n), $V_{vh}$ (n+1), $V_{vv}$ (n+2) and $V_{hv}$ (n+3) by using a pulse pair method.

More specifically, the velocity calculator 13 calculates a lag R-hat ($T_s$) of autocorrelation in each of transmission polarized waves at the time intervals of $T_s$ at which a polarized wave is repeatedly transmitted by the transmission/reception device 1 from the reflected wave intensities $V_{hh}$ (n), $V_{vh}$ (n+1), $V_{vv}$ (n+2) and $V_{hv}$ (n+3) calculated by the reflected-wave intensity calculator 11, calculates a phase difference $\phi_{DP}$-hat between polarized waves repeatedly transmitted by the transmission/reception device 1 from the lag R-hat ($T_s$), and calculates the Doppler velocity v-hat of the observation object from the lag R-hat ($T_s$), the phase difference $\phi_{DP}$-hat between polarized waves, and a Nyquist rate $v_a$.

When the Doppler velocity v-hat is calculated using the reflected wave intensities calculated by the reflected-wave intensity calculator 11, the lag R-hat ($T_a$) is expressed, in the method (pulse pair method) of estimating the autocorrelation in the alternate transmission of polarized waves, by the following equation (38).

$$\hat{R}(T_s) = \frac{1}{4M}\sum_{i=0}^{M-1}(V_{hh(4i)}^* V_{vh(4i+1)} + V_{vh(4i+1)}^* V_{vv(4i+2)} + V_{vv(4i+2)}^* V_{hv(4i+3)} + V_{hv(4i+3)}^* V_{hh(4i+4)}) \tag{38}$$

R-hat($T_s$) shown in the equation (38) can be decomposed into four equations, as shown in the following equations (39) to (42). More specifically, $R_a$-hat ($T_s$), $R_b$-hat ($T_s$), $R_c$-hat ($T_s$) and $R_d$-hat ($T_s$), which are components of R-hat ($T_a$) shown in the equation (38), can be specified.

$$\hat{R}_a(T_s) = \frac{1}{M}\sum_{i=0}^{M-1} V_{hh(4i)}^* V_{vh(4i+1)} \tag{39}$$

$$\hat{R}_b(T_s) = \frac{1}{M}\sum_{i=0}^{M-1} V_{vh(4i+1)}^* V_{vv(4i+2)} \tag{40}$$

$$\hat{R}_c(T_s) = \frac{1}{M}\sum_{i=0}^{M-1} V_{vv(4i+2)}^* V_{hv(4i+3)} \tag{41}$$

$$\hat{R}_d(T_s) = \frac{1}{M}\sum_{i=0}^{M-1} V_{hv(4i+3)}^* V_{hh(4i+4)} \tag{42}$$

$R_a$-hat ($T_s$) denotes a covariance (first covariance) between horizontally polarized waves at times when the horizontally polarized waves are received through the first transmission/reception processing, and vertically polarized waves received through the third transmission/reception processing.

$R_b$-hat($T_s$) denotes a covariance (second covariance) between vertically polarized waves at times when the vertically polarized waves are received through the third transmission/reception processing, and vertically polarized waves received through the second transmission/reception processing.

$R_c$-hat ($T_s$) denotes a covariance (third covariance) between vertically polarized waves at times when the vertically polarized waves are received through the second transmission/reception processing, and horizontally polarized waves received through the fourth transmission/reception processing.

$R_d$-hat ($T_s$) denotes a covariance (fourth covariance) between horizontally polarized waves at times when the horizontally polarized waves are received through the fourth transmission/reception processing, and horizontally polarized waves received through the first transmission/reception processing.

As a result, R-hat ($T_s$) shown in the equation (38) is expressed by the following equation (43).

$$\hat{R}(T_s) = \frac{1}{4}\left[\hat{R}_a(T_s) + \hat{R}_b(T_s) + \hat{R}_c(T_s) + \hat{R}_d(T_s)\right] \tag{43}$$

By using the reflected wave intensity $V_{hh}$ (n) shown in the equation (32) and the reflected wave intensity $V_{vh}$ (n+1) shown in the equation (33), $R_a$-hat ($T_s$) shown in the equation (39) is expressed by the following equation (44).

$$\hat{R}_a(T_s) = \langle V_{hh(n)}^* V_{vh(n+1)} \rangle \tag{44}$$

$$= \left(\frac{\lambda G}{4\pi r^2}\sum_i S_{hh}^i I^i e^{-2j(k_0+k_h)r^i(n)}\right)*$$

$$\left(\frac{\lambda G}{4\pi r^2}\sum_i S_{vh}^i I^i e^{-j(2k_0+k_h+k_v)r^i(n+1)}\right)$$

$$= \left(\frac{\lambda G}{4\pi r^2}\right)^2 \sum_i \langle S_{hh}^{*i} S_{vh}^i \rangle |I^i|^2 \times \exp\{j[(k_h-k_v)r_0 -$$

$$(2k_0+k_h+k_v)T_s v]\}$$

$R_a$-hat ($T_s$) shown in the equation (44) is expressed by the following equation (45), by using $\phi_{DP}=2(k_h-k_v)r_0$ and $\psi_d=-2(k_0+k_h)T_s v=-2(k_0+k_v)T_s v$.

$$\hat{R}_a(T_s) = \left(\frac{\lambda G}{4\pi r^2}\right)^2 \sum_i \langle S_{vh}^{*i} S_{hh}^i \rangle |I^i|^2 \times \exp\left\{j\left[\frac{1}{2}\phi_{DP} + \psi_d\right]\right\} \tag{45}$$

By using the reflected wave intensity $V_{vh}$ (n+1) shown in the equation (33) and the reflected wave intensity $V_{vv}$ (n+2) shown in the equation (34), $R_b$-hat ($T_s$) shown in the equation (40) is expressed by the following equation (46).

$$\hat{R}_b(T_s) = \langle V_{vh(n+1)}^* V_{vv(n+2)} \rangle \tag{46}$$

$$= \left(\frac{\lambda G}{4\pi r^2}\sum_i S_{hh}^i I^i e^{-j(2k_0+k_h+k_v)r^i(n+1)}\right)*$$

$$\left(\frac{\lambda G}{4\pi r^2}\sum_i S_{vh}^i I^i e^{-2j(k_0+k_v)r^i(n+2)}\right)$$

$$= \left(\frac{\lambda G}{4\pi r^2}\right)^2 \sum_i \langle S_{hh}^{*i} S_{vh}^i \rangle |I^i|^2 \times \exp\{j[(k_h-k_v)r_0 -$$

$$2(k_0 + h_v)T_s v]\}$$

$\hat{R}_b(T_s)$ shown in the equation (46) is expressed by the following equation (47), by using $\phi_{DP}=2(k_h-k_v)r_0$ and $\psi_d=-2(k_0+k_h)T_s v$.

$$\hat{R}_b(T_s) = \left(\frac{\lambda G}{4\pi r^2}\right)^2 \sum_i \langle S_{vh}^{*i} S_{hh}^i \rangle |I^i|^2 \times \exp\left\{j\left[\frac{1}{2}\phi_{DP} + \psi_d\right]\right\} \quad (47)$$

By using the reflected wave intensity $V_{vv}(n+2)$ shown in the equation (34) and the reflected wave intensity $V_{hv}(n+3)$ shown in the equation (35), $\hat{R}_c(T_s)$ shown in the equation (41) is expressed by the following equation (48).

$$\hat{R}_c(T_s) = \langle V_{vv(n+2)}^* V_{hv(n+3)} \rangle \quad (48)$$

$$= \left(\frac{\lambda G}{4\pi r^2} \sum_i S_{vv}^i I^i e^{-2j(k_0+k_v)r^i(n+2)}\right)*$$

$$\left(\frac{\lambda G}{4\pi r^2} \sum_l S_{hv}^l I^l e^{-j(2k_0+k_h+k_v)r^l(n+3)}\right)$$

$$= \left(\frac{\lambda G}{4\pi r^2}\right)^2 \sum_i \langle S_{vv}^{*i} S_{hv}^i \rangle |I^i|^2 \times \exp\{j[(k_v-k_h)r_0 - 2(k_0+k_h+k_v)T_s v]\}$$

$\hat{R}_c(T_s)$ shown in the equation (48) is expressed by the following equation (49), by using $\phi_{DP}=2(k_h-k_v)r_0$ and $\psi_d=-2(k_0+k_h)T_s v=-2(k_0+k_v)T_s v$.

$$\hat{R}_c(T_s) = \left(\frac{\lambda G}{4\pi r^2}\right)^2 \sum_i \langle S_{vh}^{*i} S_{hh}^i \rangle |I^i|^2 \times \exp\left\{j\left[-\frac{1}{2}\phi_{DP} + \psi_d\right]\right\} \quad (49)$$

By using the reflected wave intensity $V_{hv}(n+3)$ shown in the equation (35) and the reflected wave intensity $V_{hh}(n)$ shown in the equation (32), $\hat{R}_d(T_s)$ shown in the equation (42) is expressed by the following equation (50).

$$\hat{R}_d(T_s) = \langle V_{hv(n+3)}^* V_{hh(n+4)} \rangle \quad (50)$$

$$= \left(\frac{\lambda G}{4\pi r^2} \sum_i S_{hv}^i I^i e^{-j(2k_0+k_h+k_v)r^i(n+3)}\right)*$$

$$\left(\frac{\lambda G}{4\pi r^2} \sum_l S_{hh}^l I^l e^{-2j(k_0+k_h)r^l(n+4)}\right)$$

$$= \left(\frac{\lambda G}{4\pi r^2}\right)^2 \sum_i \langle S_{hv}^{*i} S_{hh}^i \rangle |I^i|^2 \times \exp\{j[(k_v-k_h)r_0 - (2k_0+k_h+k_v)T_s v]\}$$

$\hat{R}_d(T_s)$ shown in the equation (50) is expressed by the following equation (51), by using $\phi_{DP}=2(k_h-k_v)r_0$ and $\psi_d=-2(k_0+k_h)T_s v=-2(k_0+k_v)T_s v$.

$$\hat{R}_d = \left(\frac{\lambda G}{4\pi r^2}\right)^2 \sum_i \langle S_{vh}^{*i} S_{hh}^i \rangle |I^i|^2 \times \exp\left\{j\left[-\frac{1}{2}\phi_{DP} + \psi_d\right]\right\} \quad (51)$$

Figure 9:
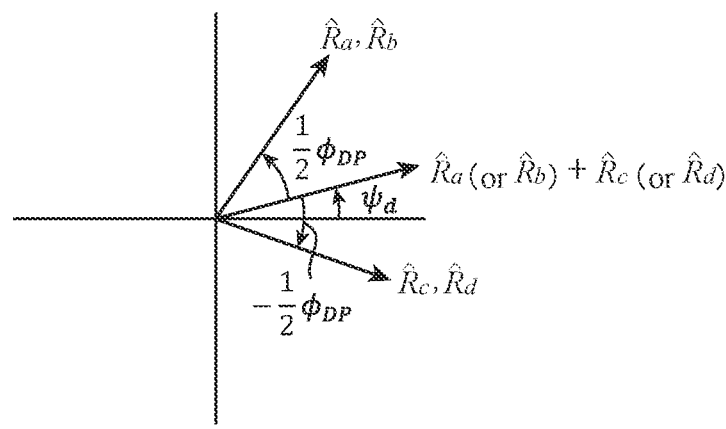
FIG. 9 is an explanatory drawing showing a relation among the phases of $R_a$-hat $(T_s)$, $R_b$-hat$(T_s)$, $R_c$-hat $(T_s)$ and $R_d$-hat $(T_s)$. which is seen from equations (45), (47), (49) and (51)

FIG. 9 is an explanatory drawing showing a relation among the phases of $R_a$-hat ($T_s$), $R_b$-hat ($T_s$), $R_c$-hat ($T_s$) and $R_d$-hat ($T_s$), which is seen from the equations (45), (47), (49) and (51). In the example shown in FIG. 9, for the sake of simplicity of the drawing, the description of ($T_s$) is omitted, and $R_a$-hat ($T_s$), $R_b$-hat ($T_s$), $R_c$-hat ($T_s$) and $R_d$-hat ($T_s$) are expressed as $R_a$-hat, $R_b$-hat, $R_c$-hat and $R_d$-hat, respectively.

As shown in FIG. 9, the difference in phase between either $R_a$-hat or $R_b$-hat and ($R_a$-hat (or $R_b$-hat)+Re-hat (or $R_d$-hat)) is $\phi_{DP}/2$, and the difference in phase between either $R_c$-hat or $R_d$-hat and ($R_a$-hat (or $R_b$-hat)+$R_c$-hat (or $R_d$-hat)) is $\phi_{DP}/2$.

Further, the phase of ($R_a$-hat (or $R_b$-hat)+$R_c$-hat (or $R_d$-hat)) is $\omega_d$.

As a result, the phase difference $\phi_{DP}$-hat between polarized waves repeatedly transmitted by the transmission/reception device 1 is expressed by the argument between $R_a$-hat ($T_s$) and $R_c$-hat($T_s$), the argument between $R_a$-hat ($T_s$) and $R_d$-hat ($T_s$), the argument between $R_b$-hat ($T_s$) and $R_c$-hat ($T_s$), or the argument between $R_b$-hat ($T_s$) and $R_d$-hat ($T_s$).

More specifically, the phase difference $\phi_{DP}$-hat between polarized waves repeatedly transmitted by the transmission/reception device 1 is expressed by the following equation (52).

$$\hat{\phi}_{DP} = \arg(\hat{R}_a(T_s)\hat{R}_c^*(T_s)) = \arg(\hat{R}_a(T_s)\hat{R}_d^*(T_s)) \quad (52)$$
$$= \arg(\hat{R}_b(T_s)\hat{R}_c^*(T_s))$$
$$= \arg(\hat{R}_b(T_s)\hat{R}_d^*(T_s))$$

In this embodiment, the example in which the velocity calculator 13 calculates, as the phase difference $\phi_{DP}$-hat between polarized waves repeatedly transmitted by the transmission/reception device 1, the argument between $R_a$-hat ($T_s$) and $R_c$-hat ($T_s$) the argument between $R_a$-hat ($T_s$) and $R_d$-hat ($T_s$), the argument between $R_b$-hat ($T_s$) and $R_s$-hat ($T_s$), or the argument between $R_b$-hat ($T_s$) and $R_d$-hat ($T_s$) is shown. Instead, the velocity calculator can calculate, as the phase difference $\phi_{DP}$-hat between polarized waves repeatedly transmitted by the transmission/reception device 1, the average of the argument between $R_a$-hat ($T_s$) and $R_c$-hat ($T_s$), the argument between $R_a$-hat ($T_s$) and $R_d$-hat ($T_s$), the argument between $R_b$-hat ($T_s$) and $R_c$-hat ($T_s$), and the argument between $R_b$-hat ($T_s$) and $R_d$-hat ($T_s$), as shown in the following equation (53).

$$\hat{\phi}_{DP} = (\arg(\hat{R}_a(T_s)\hat{R}_c^*(T_s)) + \arg(\hat{R}_a(T_s)\hat{R}_d^*(T_s)) + \arg(\hat{R}_b(T_s)\hat{R}_c^*(T_s)) + \arg(\hat{R}_b(T_s)\hat{R}_d^*(T_s)))/4 \quad (53)$$

After calculating the phase difference $\phi_{DP}$-hat between polarized waves, the velocity calculator 13 calculates the Doppler velocity v-hat of the observation object from $R_a$-hat ($T_s$) contained in the lag R-hat ($T_s$), the phase difference $\phi_{DP}$-hat between polarized waves, and the Nyquist rate $v_a$ which indicates the range allowing the Doppler velocity v-hat to be observed, as shown in the following equation (54).

$$\hat{v} = -\frac{v_a}{\pi}\arg[\exp(j\psi_d)] = -\frac{v_a}{\pi}\arg[\hat{R}_a\exp(-j\hat{\phi}_{DP})] \quad (54)$$

In this embodiment, the equation (54) is the same as a formula for calculating the Doppler velocity v-hat in a case in which either processing to transmit a single polarized wave and receive a single polarized wave or processing to concurrently transmit polarized waves and concurrently receive polarized waves is performed, and the Nyquist rate $v_a$ which indicates the range allowing the Doppler velocity v-hat to be observed is recovered to a Nyquist rate which is the same as that in the case in which either processing to transmit a single polarized wave and receive a single polarized wave or processing to concurrently transmit polarized waves and concurrently receive polarized waves is performed.

Therefore, even when the four types of polarized-wave transmission/reception processing elements are repeatedly performed, the Doppler velocity v-hat of the observation object can be calculated at the Nyquist rate $v_a$ which is the same as that in the case in which either processing to transmit a single polarized wave and receive a single polarized wave or processing to concurrently transmit polarized waves and concurrently receive polarized waves is performed.

By substituting $R_b$-hat $(T_s)$, $R_c$-hat $(T_s)$ or $R_d$-hat $(T_s)$, instead of $R_a$-hat $(T_s)$, into the equation (54), the Doppler velocity v-hat can be calculated.

As can be seen from the above descriptions, Embodiment 2 is configured to include the linear-depolarization ratio calculator 12 calculates either the linear depolarization ratio $LDR_{vh}$ which is the ratio between the radar reflectivity factor $Z_{hh}$ and the radar reflectivity factor $Z_{vh}$, or the linear depolarization ratio $LDR_{hv}$ which is the ratio between the radar reflectivity factor $Z_{vv}$ and the radar reflectivity factor $Z_{hv}$, thereby providing an advantage of being able to calculate the linear depolarization ratio $LDR_{vh}$ or $LDR_{hv}$ while preventing the Nyquist rate $v_a$ from decreasing, even when the four types of polarized-wave transmission/reception processing elements are repeatedly performed.

Embodiment 3

Figure 10:
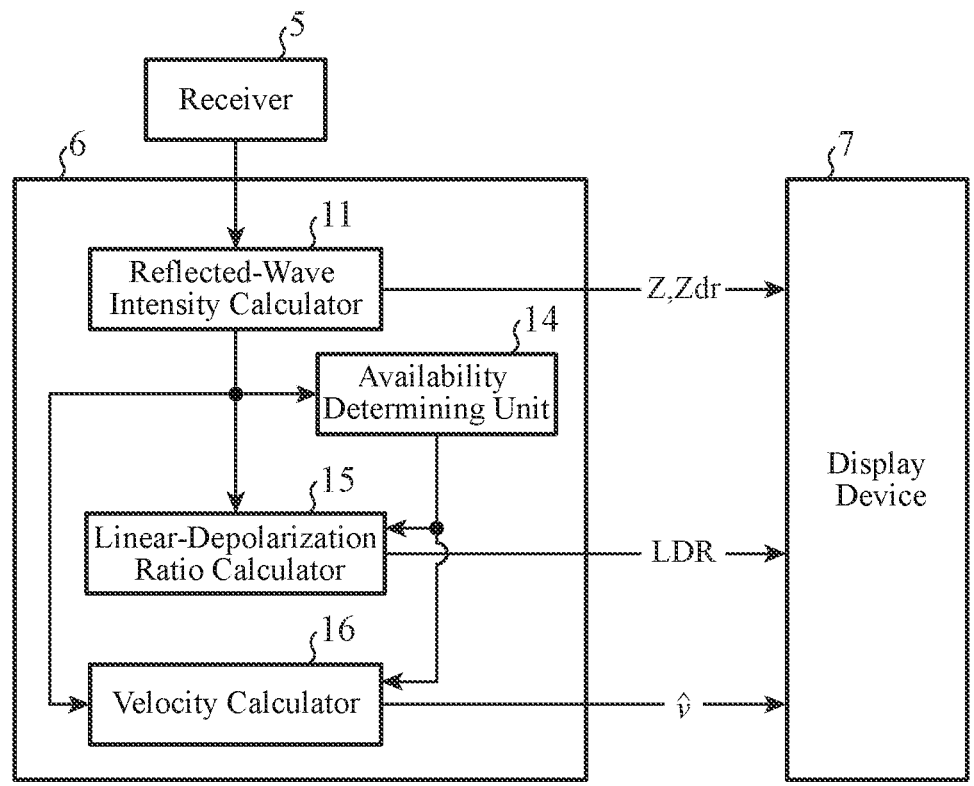
FIG. 10 is a block diagram showing a signal processing device 6 of a dual polarization radar apparatus according to Embodiment 3 of the present invention.

FIG. 10 is a block diagram showing a signal processing device 6 of a dual polarization radar apparatus according to Embodiment 3 of the present invention. In FIG. 10, because the same reference numerals as those shown in FIG. 2 denote the same components or similar components, the explanations of the components will be omitted hereafter.

Figure 11:
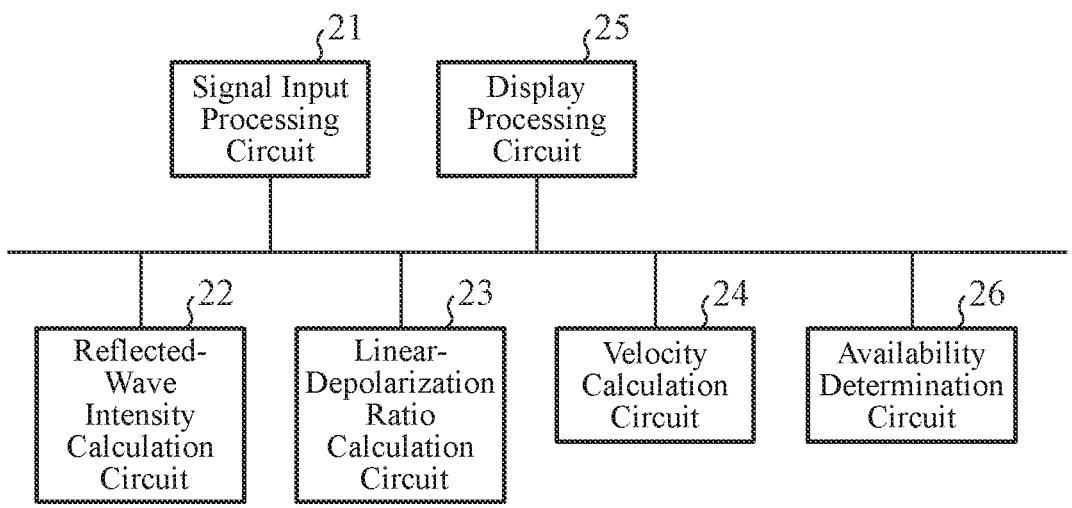
FIG. 11 is a hardware block diagram of the signal processing device 6 shown in FIG. 10.

FIG. 11 is a hardware block diagram of the signal processing device 6 shown in FIG. 10. In FIG. 11, because the same reference numerals as those shown in FIG. 3 denote the same components or similar components, the explanations of the components will be omitted hereafter.

An availability determining unit 14 is implemented by an availability determination circuit 26 that includes a semiconductor processing circuit equipped with a CPU, a one chip microcomputer or the like, and performs processing to, when a radar reflectivity factor $Z_{vh}$ (or a radar reflectivity factor $Z_{hv}$) calculated by a reflected-wave intensity calculator 11 is equal to or greater than a preset threshold Th, determine that the radar reflectivity factor $Z_{vh}$ (or the radar reflectivity factor $Z_{hv}$) is available, whereas, when the radar reflectivity factor $Z_{vh}$ (or the radar reflectivity factor $Z_{hv}$) is less than the threshold Th, determine that the radar reflectivity factor $Z_{vh}$ (or the radar reflectivity factor $Z_{hv}$) is not available.

In this Embodiment 3, it is assumed that a value which is greater than a predetermined noise level by a prescribed number of levels is set as the threshold Th, and the user is enabled to arbitrarily set the threshold. Further, the prescribed number of levels are determined arbitrarily from the capability of the radar apparatus, or the like.

A linear-depolarization ratio calculator 15 is implemented by, for example, a linear-depolarization ratio calculation circuit 23 and a display processing circuit 25, and, when the availability determining unit 14 determines that the radar reflectivity factor is available, calculates a linear depolarization ratio $LDR_{vh}$ which is the ratio between a reflected wave intensity $V_{hh}$ and a reflected wave intensity $V_{vh}$ which are calculated by the reflected-wave intensity calculator 11, i.e., the ratio between a radar reflectivity factor $Z_{hh}$ and the radar reflectivity factor $Z_{vh}$, similarly to the case of the linear-depolarization ratio calculator 12 shown in FIG. 2. Instead, the linear-depolarization ratio calculator 15 performs processing to calculate a linear depolarization ratio $LDR_{hv}$ which is the ratio between a reflected wave intensity $V_{vv}$ and a reflected wave intensity $V_{hv}$ which are calculated by the reflected-wave intensity calculator 11, i.e., the ratio between a radar reflectivity factor $Z_{vv}$ and the radar reflectivity factor $Z_{hv}$. The linear-depolarization ratio calculator further performs processing to display the calculated linear depolarization ratio $LDR_{vh}$ or $LDR_{hv}$ on a display device 7.

On the other hand, when the availability determining unit 14 determines that the radar reflectivity factor is not available, the linear-depolarization ratio calculator 15 performs neither the processing to calculate the linear depolarization ratio $LDR_{vh}$ nor the processing to calculate the linear depolarization ratio $LDR_{hv}$.

A velocity calculator 16 is implemented by a velocity calculation circuit 24 and a display processing circuit 25, and, when the availability determining unit 14 determines that the radar reflectivity factor is available, performs processing to calculate the Doppler velocity v-hat of an observation object from the reflected wave intensities $V_{hh}$, $V_{vv}$ and $V_{vh}$ or $V_{hv}$, these reflected wave intensities being calculated by the reflected-wave intensity calculator 11, by using a pulse pair method, similarly to the case of the velocity calculator 13 shown in FIG. 2. Instead, the velocity calculator can calculate the Doppler velocity v-hat of the observation object from the reflected wave intensities $V_{hh}$, $V_{vv}$, $V_{vh}$ and $V_{hv}$, similarly to the case of the above-mentioned Embodiment 2. The velocity calculator 16 also performs processing to display the calculated Doppler velocity v-hat on the display device 7.

The velocity calculator 16 further performs processing to, when the availability determining unit 14 determines that the radar reflectivity factor is not available, calculate the Doppler velocity v-hat of the observation object from the reflected wave intensities $V_{hh}$ and $V_{vv}$, for example, similarly to the case of the radar apparatus disclosed in Non-patent Literature 1.

In the example shown in FIG. 10, it is assumed that each of the following components: the reflected-wave intensity calculator 11, the availability determining unit 14, the linear-depolarization ratio calculator 15 and the velocity calculator 16, which are components of the signal processing device 6, includes dedicated hardware components. Instead, the signal processing device 6 can include a computer.

In the case in which the signal processing device 6 includes a computer, a program in which processes performed by the reflected-wave intensity calculator 11, the availability determining unit 14, the linear-depolarization ratio calculator 15 and the velocity calculator 16 are described can be stored in a memory 31 of the computer shown in FIG. 4, and a processor 32 of the computer can be made to execute the program stored in the memory 31.

Next, operations will be explained.

Although, in above-mentioned Embodiment 1, the example in which the linear-depolarization ratio calculator 12 always calculates either the linear depolarization ratio $LDR_{vh}$ which is the ratio between the radar reflectivity factor $Z_{hh}$ and the radar reflectivity factor $Z_{vh}$, or the linear depolarization ratio $LDR_{hv}$ which is the ratio between the radar reflectivity factor $Z_{vv}$ and the radar reflectivity factor $Z_{hv}$ has been described, the linear-depolarization ratio calculator can calculate neither the linear depolarization ratio $LDR_{vh}$ nor the linear depolarization ratio $LDR_{hv}$ with a high degree of accuracy when cross polarized waves have low electric power and are unreliable as signals.

To solve this problem, in this Embodiment 3, only under circumstances where the linear depolarization ratio $LDR_{vh}$ and the linear depolarization ratio $LDR_{hv}$ can be calculated with a high degree of accuracy, the linear-depolarization ratio calculator calculates the linear depolarization ratio $LDR_{vh}$ or $LDR_{hv}$.

Concretely, the signal processing device operates in the following way.

When the reflected-wave intensity calculator 11 calculates the radar reflectivity factor $Z_{vh}$ (or the radar reflectivity factor $Z_{hv}$), the availability determining unit 14 compares the radar reflectivity factor $Z_{vh}$ (or the radar reflectivity factor $Z_{hv}$) with the preset threshold Th.

When the radar reflectivity factor $Z_{vh}$ (or the radar reflectivity factor $Z_{hv}$) is equal to or greater than the threshold Th, the availability determining unit 14 determines that the radar reflectivity factor $Z_{vh}$ (or the radar reflectivity factor $Zh_v$) is available because cross polarized waves have high electric power and are reliable as signals.

In contrast, when the radar reflectivity factor $Z_{vh}$ (or the radar reflectivity factor $Zh_v$) is less than the threshold Th, the availability determining unit determines that the radar reflectivity factor $Z_{vh}$ (or the radar reflectivity factor $Z_{hv}$) is not available because cross polarized waves have low electric power and are unreliable as signals.

When the availability determining unit 14 determines that the radar reflectivity factor is available, the linear-depolarization ratio calculator 15 calculates the linear depolarization ratio $LDR_{vh}$ which is the ratio between the reflected wave intensity $V_{hh}$ and the reflected wave intensity $V_{vh}$ which are calculated by the reflected-wave intensity calculator 11, i.e., the ratio between the radar reflectivity factor $Z_{hh}$ and the radar reflectivity factor $Z_{vh}$, similarly to the case of the linear-depolarization ratio calculator 12 shown in FIG. 2. Instead, the linear-depolarization ratio calculator calculates the linear depolarization ratio $LDR_{hv}$ which is the ratio between the reflected wave intensity $V_{vv}$ and the reflected wave intensity $V_{hv}$ which are calculated by the reflected-wave intensity calculator 11, i.e., the ratio between the radar reflectivity factor $Z_{vv}$ and the radar reflectivity factor $Z_{hv}$.

Further, the linear-depolarization ratio calculator 15 displays the calculated linear depolarization ratio $LDR_{vh}$ or $LDR_{hv}$ on the display device 7, similarly to the case of the linear-depolarization ratio calculator 12 shown in FIG. 2.

When the availability determining unit 14 determines that the radar reflectivity factor is not available, the linear-depolarization ratio calculator 15 performs neither the processing to calculate the linear depolarization ratio $LDR_{vh}$ nor the processing to calculate the linear depolarization ratio $LDR_{hv}$.

When the availability determining unit 14 determines that the radar reflectivity factor is available, the velocity calculator 16 calculates the Doppler velocity v-hat of the observation object from the reflected wave intensities $V_{hh}$, $V_{vv}$ and $V_{vh}$ or $V_{hv}$ by using the pulse pair method, the reflected wave intensities being calculated by the reflected-wave intensity calculator 11, and displays the Doppler velocity v-hat on the display device 7, similarly to the case of the velocity calculator 13 shown in FIG. 2.

When the availability determining unit 14 determines that the radar reflectivity factor is not available, the velocity calculator 16 calculates the Doppler velocity v-hat of the observation object from the reflected wave intensities $V_{hh}$ and $V_{vv}$, which are acquired through the two types of polarized-wave transmission/reception processing elements, for example, similarly to the case of the radar apparatus disclosed in Non-patent Literature 1, and displays the Doppler velocity v-hat on the display device 7.

As can be seen from the above description, the linear-depolarization ratio calculator 15 according to this Embodiment 3 is configured so as to, when the availability determining unit 14 determines that the radar reflectivity factor is available, calculate the linear depolarization ratio $LDR_{vh}$ or $LDR_{hv}$, there is provided an advantage of being able to display only the linear depolarization ratio which is calculated with a high degree of accuracy on the display device 7.

It is to be understood that a combination of two or more of the above-mentioned embodiments can be freely made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

The present invention is suitable for a dual polarization radar apparatus and a radar signal processing method that need to estimate a Doppler velocity within a wide Nyquist rate range.

REFERENCE SIGNS LIST

1: transmission/reception device; 2: transmitter; 3: transmission-reception switch; 4: antenna; 5: receiver; 6: signal processing device; 7: display device; 11: reflected-wave intensity calculator; 12, 15: linear-depolarization ratio calculator; 13, 16: velocity calculator; 14: availability determining unit; 21: signal input processing circuit; 22: reflected-wave intensity calculation circuit; 23: linear-depolarization ratio calculation circuit; 24: velocity calculation circuit; 25: display processing circuit; 26: determination circuit; 31: memory; and 32: processor.

The invention claimed is:

1. A dual polarization radar apparatus comprising:
a transmission/reception device to repeatedly perform, in turn, first transmission/reception processing to transmit a horizontally polarized wave and receive a horizontally polarized wave, second transmission/reception processing to transmit a vertically polarized wave and receive a vertically polarized wave, and either third transmission/reception processing to transmit a horizontally polarized wave and receive a vertically polarized wave or fourth transmission/reception processing to transmit a vertically polarized wave and receive a horizontally polarized wave;
a reflected-wave intensity calculator to calculate a first reflected wave intensity which is a power value of a horizontally polarized wave received through the first transmission/reception processing, calculate a second reflected wave intensity which is a power value of a vertically polarized wave received through the second transmission/reception processing, and calculate either a third reflected wave intensity which is a power value of a vertically polarized wave received through the third transmission/reception processing, or a fourth reflected wave intensity which is a power value of a horizontally polarized wave received through the fourth transmission/reception processing;
a linear-depolarization ratio calculator to calculate a linear depolarization ratio which is either a ratio between the first reflected wave intensity and the third reflected wave intensity or a ratio between the second reflected wave intensity and the fourth reflected wave intensity; and
a velocity calculator to use a pulse pair method to calculate a Doppler velocity of an observation object reflecting polarized waves, from the first reflected wave intensity, the second reflected wave intensity and either the third reflected wave intensity or the fourth reflected wave intensity,
the velocity calculator calculating a lag of autocorrelation in each of transmission polarized waves at time intervals at which a polarized wave is repeatedly transmitted by the transmission/reception device, from the first reflected wave intensity, the second reflected wave intensity and either the third reflected wave intensity or the fourth reflected wave intensity, calculating a phase difference between polarized waves repeatedly transmitted by the transmission/reception device from the lag, and calculating the Doppler velocity of the observation object, from the lag, the phase difference between polarized waves, and a Nyquist rate which indicates a range allowing the Doppler velocity to be observed.

2. A dual polarization radar apparatus comprising:
a transmission/reception device to repeatedly perform, in turn, first transmission/reception processing to transmit a horizontally polarized wave and receive a horizontally polarized wave, third transmission/reception processing to transmit a horizontally polarized wave and receive a vertically polarized wave, second transmission/reception processing to transmit a vertically polarized wave and receive a vertically polarized wave, and the fourth transmission/reception processing to transmit a vertically polarized wave and receive a horizontally polarized wave;
a reflected-wave intensity calculator to calculate a first reflected wave intensity which is a power value of a horizontally polarized wave received through the first transmission/reception processing, calculate a second reflected wave intensity which is a power value of a vertically polarized wave received through the second transmission/reception processing, calculate a third reflected wave intensity which is a power value of a vertically polarized wave received through the third transmission/reception processing and calculate a fourth reflected wave intensity which is a power value of a horizontally polarized wave received through the fourth transmission/reception processing;
a linear-depolarization ratio calculator to calculate a linear depolarization ratio which is either a ratio between the first reflected wave intensity and the third reflected wave intensity or a ratio between the second reflected wave intensity and the fourth reflected wave intensity; and a velocity calculator to use a pulse pair method to calculate a Doppler velocity of an observation object reflecting polarized waves, from the first reflected wave intensity, the second reflected wave intensity, the third reflected wave intensity and the fourth reflected wave intensity, which are calculated by the reflected-wave intensity calculator,
the velocity calculator calculating a lag of autocorrelation in each of transmission polarized waves at time intervals at which a polarized wave is repeatedly transmitted by the transmission/reception device, from the first reflected wave intensity, the second reflected wave intensity, the third reflected wave intensity and the fourth reflected wave intensity, calculating a phase difference between polarized waves repeatedly transmitted by the transmission/reception device from the lag, and calculating the Doppler velocity of the observation object, from the lag, the phase difference between polarized waves, and a Nyquist rate which indicates a range allowing the Doppler velocity to be observed.

3. The dual polarization radar apparatus according to claim 1, wherein the reflected-wave intensity calculator calculates either a radar reflectivity factor in the third transmission/reception processing from the third reflected wave intensity, or a radar reflectivity factor in the fourth transmission/reception processing from the fourth reflected wave intensity.

4. The dual polarization radar apparatus according to claim 3, further comprising an availability determining unit to determine that the radar reflectivity factor is available when the radar reflectivity factor calculated by the reflected-wave intensity calculator is equal to or greater than a threshold, and to determine that the radar reflectivity factor is unavailable when the radar reflectivity factor is less than the threshold, wherein
the linear-depolarization ratio calculator performs processing to calculate the linear depolarization ratio when the radar reflectivity factor is determined to be available by the availability determining unit, and does not perform the processing to calculate the linear depolarization ratio when the radar reflectivity factor is determined to be unavailable by the availability determining unit.

5. The dual polarization radar apparatus according to claim 1, wherein, from the lag, the velocity calculator specifies:
a first covariance which is a covariance between horizontally polarized waves at times when the horizontally polarized waves are received through the first transmission/reception processing in the transmission/reception device, and vertically polarized waves received through the second transmission/reception processing;
a second covariance which is a covariance between vertically polarized waves at times when the vertically polarized waves are received through the second transmission/reception processing, and either vertically polarized waves received through the third transmission/reception processing or horizontally polarized waves received through the fourth transmission/reception processing; and
a third covariance which is a covariance between either vertically polarized waves at times when the vertically polarized waves are received through the third transmission/reception processing or horizontally polarized waves at times when the horizontally polarized waves are received through the fourth transmission/reception processing, and horizontally polarized waves received through the first transmission/reception processing, and wherein the velocity calculator calculates, as the phase difference between polarized waves repeatedly transmitted by the transmission/reception device, either two-thirds of an argument between the first covariance and the second covariance or two-thirds of an argument between the first covariance and the third covariance.

6. The dual polarization radar apparatus according to claim 1, wherein, from the lag, the velocity calculator specifies:
a first covariance which is a covariance between horizontally polarized waves at times when the horizontally polarized waves are received through the first transmission/reception processing in the transmission/reception device, and vertically polarized waves received through the second transmission/reception processing;
a second covariance which is a covariance between vertically polarized waves at times when the vertically polarized waves are received through the second transmission/reception processing, and either vertically polarized waves received through the third transmission/reception processing or horizontally polarized waves received through the fourth transmission/reception processing; and
a third covariance which is a covariance between either vertically polarized waves at times when the vertically polarized waves are received through the third transmission/reception processing or horizontally polarized waves at times when the horizontally polarized waves are received through the fourth transmission/reception processing, and horizontally polarized waves received through the first transmission/reception processing, and wherein the velocity calculator calculates, as the phase difference between polarized waves repeatedly transmitted by the transmission/reception device, an average of two-thirds of an argument between the first covariance and the second covariance and two-thirds of an argument between the first covariance and the third covariance.

7. The dual polarization radar apparatus according to claim 2, wherein, from the lag, the velocity calculator specifies:
a first covariance which is a covariance between horizontally polarized waves at times when the horizontally polarized waves are received through the first transmission/reception processing, and vertically polarized waves received through the third transmission/reception processing;
a second covariance which is a covariance between vertically polarized waves at times when the vertically polarized waves are received through the third transmission/reception processing, and vertically polarized waves received through the second transmission/reception processing;
a third covariance which is a covariance between vertically polarized waves at times when the vertically polarized waves are received through the second transmission/reception processing, and horizontally polarized waves received through the fourth transmission/reception processing, and
a fourth covariance which is a covariance between horizontally polarized waves at times when the horizontally polarized waves are received through the fourth transmission/reception processing, and horizontally polarized waves received through the first transmission/reception processing, and wherein the velocity calculator calculates, as the phase difference between polarized waves repeatedly transmitted by the transmission/reception device, an argument between the first covariance and the third covariance, an argument between the first covariance and the fourth covariance, an argument between the second covariance and the third covariance, or an argument between the second covariance and the fourth covariance.

8. The dual polarization radar apparatus according to claim 2, wherein, from the lag, the velocity calculator specifies:
a first covariance which is a covariance between horizontally polarized waves at times when the horizontally polarized waves are received through the first transmission/reception processing, and vertically polarized waves received through the third transmission/reception processing;
a second covariance which is a covariance between vertically polarized waves at times when the vertically polarized waves are received through the third transmission/reception processing, and vertically polarized waves received through the second transmission/reception processing;
a third covariance which is a covariance between vertically polarized waves at times when the vertically polarized waves are received through the second transmission/reception processing, and horizontally polarized waves received through the fourth transmission/reception processing; and
a fourth covariance which is a covariance between horizontally polarized waves at times when the horizontally polarized waves are received through the fourth transmission/reception processing, and horizontally polarized waves received through the first transmission/reception processing, and wherein the velocity calculator calculates, as the phase difference between polarized waves repeatedly transmitted by the transmission/reception device, an average of an argument between the first covariance and the third covariance, an argument between the first covariance and the fourth covariance, an argument between the second covariance and the third covariance, and an argument between the second covariance and the fourth covariance.

9. A radar signal processing method comprising:
in a transmission/reception device, repeatedly performing, in turn, first transmission/reception processing to transmit a horizontally polarized wave and receive a horizontally polarized wave, second transmission/reception processing to transmit a vertically polarized wave and receive a vertically polarized wave, and either third transmission/reception processing to transmit a horizontally polarized wave and receive a vertically polarized wave or fourth transmission/reception processing to transmit a vertically polarized wave and receive a horizontally polarized wave;
calculating a first reflected wave intensity which is a power value of a horizontally polarized wave received through the first transmission/reception processing;
calculating a second reflected wave intensity which is a power value of a vertically polarized wave received through the second transmission/reception processing;
calculating either a third reflected wave intensity which is a power value of a vertically polarized wave received through the third transmission/reception processing, or a fourth reflected wave intensity which is a power value of a horizontally polarized wave received through the fourth transmission/reception processing;

calculating a linear depolarization ratio which is either a ratio between the first reflected wave intensity and the third reflected wave intensity or a ratio between the second reflected wave intensity and the fourth reflected wave intensity;

using a pulse pair method to calculate a lag of autocorrelation in each of transmission polarized waves at time intervals at which a polarized wave is repeatedly transmitted by the transmission/reception device, from the first reflected wave intensity, the second reflected wave intensity and either the third reflected wave intensity or the fourth reflected wave intensity;

calculating a phase difference between polarized waves repeatedly transmitted by the transmission/reception device from the lag;

calculating a Doppler velocity of the observation object, from the lag, the phase difference between polarized waves, and a Nyquist rate which indicates a range allowing the Doppler velocity to be observed; and displaying the calculated Doppler velocity to a user on a display device.

10. The radar signal processing method according to claim 9, including displaying the linear depolarization ratio on the display device.

* * * * *